(12) United States Patent
Bacche

(10) Patent No.: US 7,324,163 B2
(45) Date of Patent: Jan. 29, 2008

(54) SUB-CARRIER DETECTION (SCD) FOR MOTION THRESHOLD LOGIC

(75) Inventor: Ravi Ananthapur Bacche, San Jose, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 575 days.

(21) Appl. No.: 11/008,844

(22) Filed: Dec. 9, 2004

(65) Prior Publication Data

US 2005/0134740 A1   Jun. 23, 2005

Related U.S. Application Data

(63) Continuation-in-part of application No. 10/986,518, filed on Nov. 10, 2004.

(60) Provisional application No. 60/619,058, filed on Oct. 15, 2004, provisional application No. 60/532,446, filed on Dec. 23, 2003.

(51) Int. Cl.
*H04N 5/14* (2006.01)

(52) U.S. Cl. .................................................. 348/663

(58) Field of Classification Search ................ 348/663, 348/664, 665, 666, 667, 668, 669, 670, 712, 348/713

See application file for complete search history.

(56) References Cited

U.S. PATENT DOCUMENTS

| | | | |
|---|---|---|---|
| 4,125,856 A * | 11/1978 | Netravali et al. ...... | 375/240.25 |
| 4,652,907 A | 3/1987 | Fling | |
| 5,311,306 A | 5/1994 | Tanaka et al. | |
| 5,400,083 A | 3/1995 | Mizusawa | |
| 5,500,686 A * | 3/1996 | Yamaguchi et al. ........ | 348/663 |
| 5,519,438 A * | 5/1996 | Elliott et al. ................ | 348/180 |
| 5,786,872 A | 7/1998 | Miyazaki et al. | |
| 5,838,383 A * | 11/1998 | Chimoto et al. ............ | 348/553 |
| 5,844,623 A * | 12/1998 | Iwamura ...................... | 725/70 |
| 5,990,978 A | 11/1999 | Kim et al. | |

(Continued)

FOREIGN PATENT DOCUMENTS

EP   0 242 935 B1   10/1987

(Continued)

OTHER PUBLICATIONS

Examination Report from Australian Patent Office dated Sep. 28, 2006 from corresponding Singapore Application No. SG 200506302-9.

(Continued)

*Primary Examiner*—Paulos M. Natnael
(74) *Attorney, Agent, or Firm*—Beyer Weaver LLP

(57) ABSTRACT

An apparatus comprising a video decoder configured to receive a composite video signal modulated on a sub-carrier signal and having a luma component and a chroma component, the video decoder configured to perform a motion detection operation on the luma component and the chroma component in a plurality of frequency regions respectively. The video decoder includes variable threshold logic, coupled to the video decoder, and configured to provide a unique threshold value to the video decoder for each of the plurality of frequency regions respectively. The apparatus also includes a sub-carrier detection logic, coupled to the variable threshold logic, and configured to detect the sub-carrier signal by checking both spatial and temporal characteristics of the sub-carrier detection logic.

10 Claims, 22 Drawing Sheets

U.S. PATENT DOCUMENTS

| | | | |
|---|---|---|---|
| 6,246,827 B1 * | 6/2001 | Strolle et al. | 386/33 |
| 6,300,985 B1 | 10/2001 | Lowe et al. | |
| 6,317,165 B1 * | 11/2001 | Balram et al. | 348/699 |
| 6,774,954 B1 | 8/2004 | Lee | |
| 7,027,102 B2 * | 4/2006 | Sacca | 348/572 |
| 2002/0163595 A1 | 11/2002 | Adams | |
| 2004/0189875 A1 | 9/2004 | Zhai et al. | |
| 2005/0134745 A1 | 6/2005 | Bacche | |

FOREIGN PATENT DOCUMENTS

| | | |
|---|---|---|
| EP | 0 376 330 B1 | 3/1996 |
| WO | WO 00/54516 | 9/2000 |

OTHER PUBLICATIONS

Search Report from Australian Patent Office dated Sep. 28, 2006 from corresponding Singapore Application No. SG 200506302-9.

Written Opinion from Australian Patent Office dated Feb. 14, 2006 from corresponding Singapore Application No. SG 200407681-6.

Search Report from Australian Patent Office dated Feb. 14, 2006 from corresponding Singapore Application No. SG 200407681-6.

International Search Report dated Jun. 1, 2005 from corresponding European Patent Application No. EP 04 25 8048.

Choi et al., "Motion Adaptive 3D Y/C Separation Algorithm Using Motion Estimation and Motion Compensation," IEEE Transactions on Consumer Electronics, vol. 47, No. 4, Nov. 2001, pp. 770-778.

* cited by examiner

Final_Motion_Diagram

SUB-CARRIER DETECTION (SCD) FOR MOTION THRESHOLD LOGIC

CROSS REFERENCE TO RELATED APPLICATIONS

The present application claims priority under 35 U.S.C. §119(e) from U.S. Provisional Patent Application No. 60/619,058 entitled "Sub-Carrier Detection (SCD) For Motion Threshold Logic" filed Oct. 15, 2004, the entire disclosure of which is incorporated herein by reference for all purposes.

The present application is also a Continuation-in-Part of U.S. patent application Ser. No. 10/986,518, entitled "Motion Detection in Video Signals", filed Nov. 10, 2004, from which priority under 35 U.S.C. §120 is claimed, and which claims priority under 35 U.S.C. §119(e) from U.S. Provisional Patent Application No. 60/532,446 entitled "MOTION DETECTION SCHEME FOR NTSC/PAL" filed Dec. 23, 2003 both of which are incorporated herein by reference for all purposes in their entirety.

BACKGROUND

This invention relates to video processing, and more particularly, to an apparatus and method for adaptive threshold logic for motion detection for decoding NTSC and PAL video signals.

In the National TV Systems Committee (NTSC) standard for television transmission, RGB (Red Green and Blue) signals from a television camera are converted into a luma signal and a chroma signal to allow for efficient transmission. The luma signal, which is typically labeled 'Y', describes the brightness and maximum detail of a picture registered with the television camera. The chroma signal is a combination of two color difference signals R-Y (red minus Y) and B-Y (blue minus Y), both of which are bandwidth limited to about 1 MHz. The respective color difference signals are used to modulate the phase and amplitude of a 3.58 MHz sub-carrier signal. The phase modulation represents the hue, or specific color intended, whereas the amplitude modulation represents the intensity, or saturation, of the color difference signal. The frequency of the sub-carrier is chosen such that the chroma signal can be frequency interleaved with the luma signal to generate a single, composite signal having no energy interference between the chroma and luma signals.

When a television set receives the NTSC composite signal, the composite signal is decoded in a decoder to separate the luma and chroma signals. The chroma signal is then demodulated into R-Y and B-Y component signals that can be used to recreate RGB signals to be displayed on the television screen. Since the luma and chroma signals share the same frequency bandwidth at around 3.58 MHz, and the luma and chroma signals are not prefiltered before they are added, the luma and chroma signals cannot be fully separated in the decoding process. Thus, as a result of the crosstalk between the luma and chroma signals, various decoding artifacts are present. A number of methods have been designed to achieve a better separation of the luma and chroma signals during the decoding process in order to minimize the decoding artifacts.

In general, there are two methods for separating the luma and chroma signals. Both involve filters that are designed to discern one portion of the composite signal from the other. The first method uses a "notch/bandpass filter," and the second method uses a "comb filter." There are several different types of comb filters that all have specific advantages and drawbacks.

The notch filter is designed to pass all frequencies of the composite signal, except the frequency of the chroma signal centered at 3.58 MHz. As a result, the chroma signal is removed, but so is also a corresponding portion of the luma signal, resulting in a loss of high frequency luma information. The notch filter is used in parallel with a bandpass filter, which passes only the frequencies in the narrow chroma band and outputs the chroma signal and the high frequency portion of the luma signal. In summary, the notch/bandpass filter method has the advantages of being a simple, low-cost approach with little or no loss of vertical resolution (that is, low frequencies). The drawbacks are that the luma resolution is lost and that heavy display artifacts result when the high frequency luma is treated as chroma (which is known as a "rainbow pattern" artifact), and when chroma is treated as luma (which is known as dot crawls).

With the comb filtering methods, the sub-carrier phase is designed to reverse by 180 degrees between two adjacent image lines (and thereby also between two adjacent frames, since there is an odd number of lines within a frame). There are two major types of comb filtering: line combing and frame combing. In both methods, the basic concept involves adding or subtracting two identical signals that have the chroma phase reversed by 180 degrees. When adding the signals, the chroma signal is canceled out and the luma signal is output, and when subtracting the signals, the luma information is lost and the chroma signal is output.

One line, two lines or three lines can be used with in-line combing. When a single line is used, the incoming video signal is delayed by one line and the corresponding delayed and un-delayed pixels are added and subtracted to obtain the luma and chroma signals respectively. When two lines are used, weighted addition and subtraction of one-line delayed, two-line delayed and un-delayed pixels are used to obtain the luma and chroma signals respectively. When three lines are used, a correlation is determined between lines 1 and 2 and lines 2 and 3. The comb filtering is then performed on the two lines that have the best correlation. The three-line adaptive comb filter is often referred to as a 2D adaptive comb filter. All line combing methods produce better results than the notch/bandpass filter method, but still show cross-color, vertical resolution loss, and dot crawls when a single line color is present.

Frame combing is similar to line combing, but instead of comparing two adjacent lines within a single frame, two lines with the same position within two adjacent frames are used for the combing, thereby extending the comb filtering into the temporal domain. However, frame combing can only be performed for still portions of an image. If motion is present, then it is necessary to revert back to 2D-combing. The method of using the motion detection to change comb filtering from line combing to frame combing is referred to as motion-adaptive decoding, or 3D adaptive decoding. The 3D adaptive decoding keeps full horizontal and vertical resolution without dot crawls and cross color for still images. However, motion artifacts, such as large area dot crawls and ghosting shadows, can be present.

In the 3D adaptive decoding, the comb filtering is switched between the 3D and 2D comb filtering methods on a pixel-by-pixel basis. If no motion is present, then the 3D comb filter is applied, and if motion is present, then the 2D comb filter is applied. Hence, there is a need to minimize the motion artifacts by accurately detecting whether there is "true motion" between two frames, or whether the perceived motion is "false motion" due to, for example, jitter or noise.

SUMMARY

An apparatus comprising a video decoder configured to receive a composite video signal modulated on a sub-carrier signal and having a luma component and a chroma component, the video decoder configured to perform a motion detection operation on the luma component and the chroma component in a plurality of frequency regions respectively. The video decoder includes variable threshold logic, coupled to the video decoder, and configured to provide a unique threshold value to the video decoder for each of the plurality of frequency regions respectively. The apparatus also includes a sub-carrier detection logic, coupled to the variable threshold logic, and configured to detect the sub-carrier signal by checking both spatial and temporal characteristics of the sub-carrier detection logic.

DESCRIPTION OF DRAWINGS

Like reference symbols in the various drawings indicate like elements.

DETAILED DESCRIPTION

Overview

The invention relates to methods and apparatus for detecting motion in video signals, such as composite NTSC, PAL signals or component video signals, which are received by a television set. First, an overview of a decoder implementing the novel motion detection scheme will be given, and then the motion detection in the various frequency regions will be presented. This will be followed by a description of how the individual threshold values are adjusted and a presentation of how the detected motion is used by a blender in the decoder to determine whether to output a 2D or 3D decoded signal. The discussion herein will primarily be focused on NTSC signals, but is equally applicable to PAL signals, or to component video signals, with some minor modifications that will be addressed at the end of this description.

Figure 1:
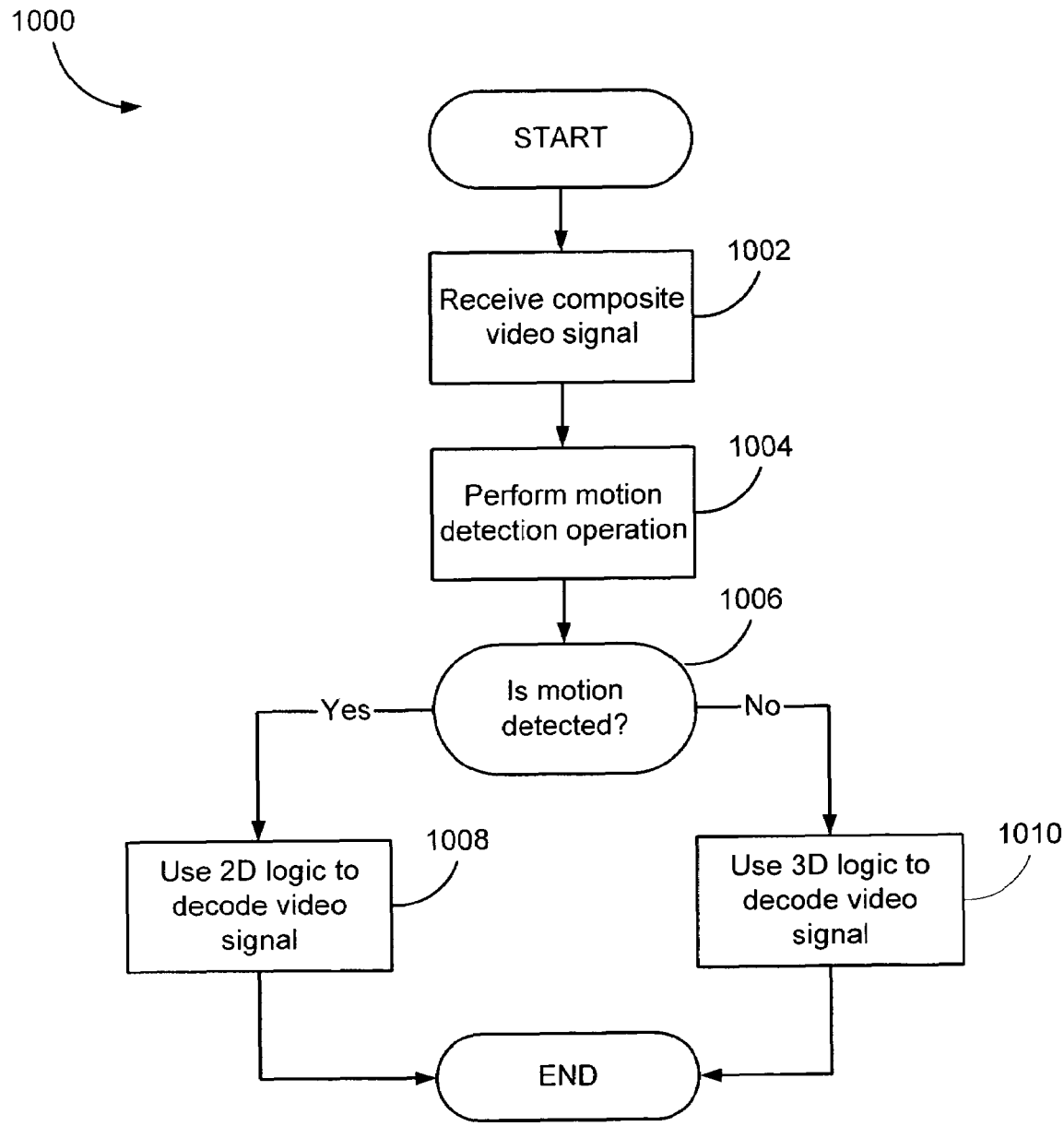
FIG. 1 shows a high-level flowchart of a process performed by a decoder in accordance with the invention.

FIG. 1 shows a high-level flowchart of a process (1000) performed by a 3D decoder implementing the novel motion detection scheme. As can be seen in FIG. 1, a composite video signal containing both chroma and luma components is received in the decoder (step 1002). A motion detection operation is then performed on the incoming composite video signal (step 1004). As will be discussed in further detail below, the motion detection operation is performed both for chroma and luma in several frequency regions. Each region has a unique threshold value that is adjustable and therefore allows for better detection of "true motion" versus "false motion," resulting in a decoded image with fewer motion artifacts compared to conventional 3D decoders. The process then examines whether motion was detected or not in the motion detection operation (step 1006). If motion was detected, the process proceeds to step 1008 where 2D logic is used to decode the composite signal. However, if no motion was detected in step 1006, the process continues to step 1010 where 3D logic is used to decode the composite signal.

Figure 2:
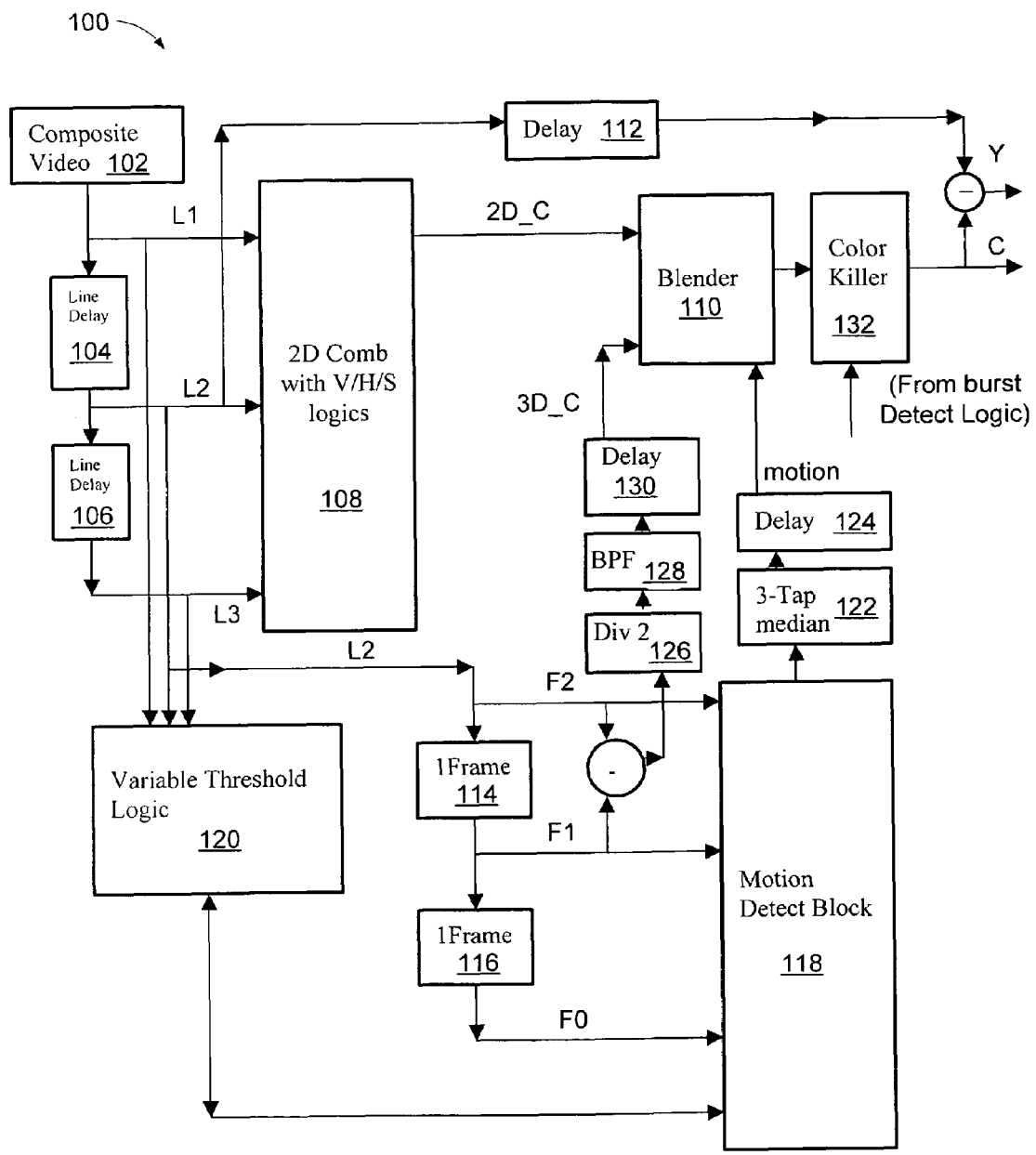
FIG. 2 shows a schematic block diagram of a decoder in accordance with the invention.

FIG. 2 shows a schematic block diagram of a decoder (100) for decoding NTSC composite signals received by a television set. The 3D decoder (100) receives a composite video signal (102). The composite video signal (102) is delayed by one and two lines in a first and a second line delay (104; 106) respectively. A current line signal (L1) along with a one-line delayed signal (L2) and a two-line delayed signal (L3) enters an adaptive 2D decoder (108) with vertical logic, horizontal logic, and single-line logic. The adaptive 2D decoder (108) filters out the chroma signal (2D_C) from the composite video signal, and passes the filtered 2D_C chroma signal to a blender (110), which will be described in further detail below. The one-line delayed signal (L2) is also passed to a delay (112), which compensates for the processing time required for filtering out the chroma signal, to generate the luma signal (Y). In addition to the adaptive 2D decoder (108), the decoder (100) contains logic for generating a motion-adaptive, 3D chroma signal (3D_C), which is also passed to the blender (110). Two frame memories (114; 116) are used in the detection of chroma motion, as the chroma samples are in phase across two frames (that is, in frames F0 and F2), and a loss-free correlation can easily be determined in the motion detection block (118).

Figure 3:
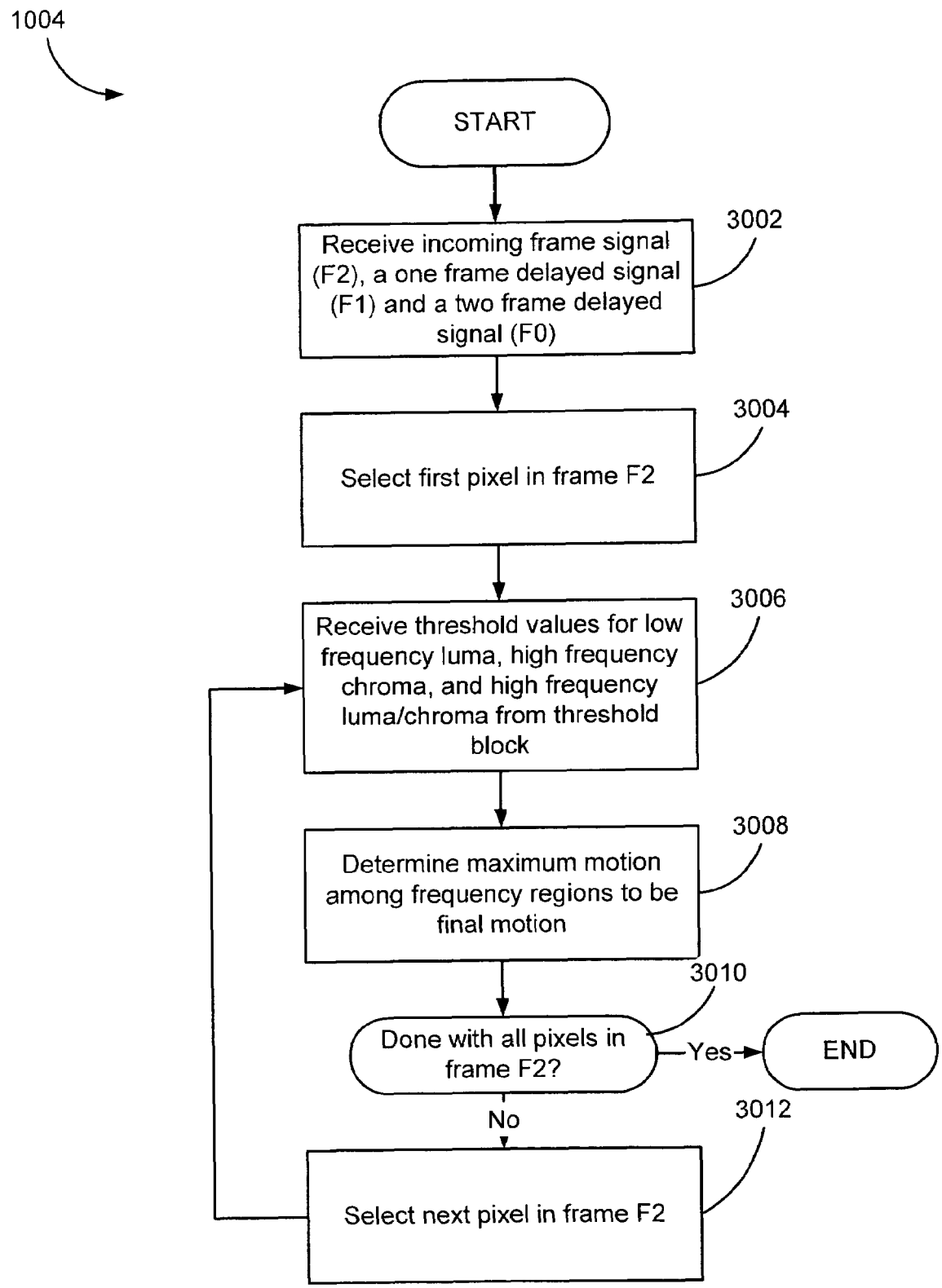
FIG. 3 shows a high-level flowchart of the motion detection operation of FIG. 1.

FIG. 3 shows a high-level flowchart of the motion detection operation of FIG. 1 (step 1004), which is performed by the motion detection block (118). As can be seen in FIG. 3, the motion detection process starts by receiving an incoming frame signal, a one-frame delayed signal, and a two-frame delayed signal (step 3002). A first pixel in the incoming frame signal is selected (step 3004). The motion detection block (118) then receives separate threshold values for the low frequency luma domain, the high frequency chroma domain and the high frequency luma/chroma domain, respectively, from the variable threshold logic block (120) (step 3006). As a result of the variable threshold logic block (120) supplying a separate threshold value for each pixel and each frequency domain, the motion detection is significantly improved compared to conventional motion detection techniques. In one implementation, the threshold values are based on the pixel's value as compared to its immediate neighboring pixels. The process determines the maximum motion among the motions in the different frequency domains to be the final motion value for the pixel (step 3008). The process then checks whether all pixels in the incoming frame have been processed (step 3010). If all pixels are done, the process ends. Otherwise, a next pixel in the incoming frame is selected (step 3012), and the process repeats steps 3006 through 3010 until all pixels have been processed. This motion detection process is performed for each received frame.

Returning now to FIG. 2, when the final motion value has been determined, the final motion value is passed from the motion detection block (118) to the blender (110) through a 3-tap median filter (122) and a delay block (124). The median tap filter (122) filters the maximum motion value to remove any sparkle motion or non-motion points in the pixel stream. The 3D chroma signal (3D_C) is generated from a current pixel and a corresponding pixel that is one frame prior, that is, F2-F1, and is then divided by a factor two (126). A band pass filter (128) and a delay (130) are applied to signal before the signal is passed to the blender (110). The band pass filter limits the bandwidth of the 3D chroma signal before the signal reaches the blender (110). In one implementation, the chroma band pass filter (128) is a 5-tap filter with coefficients of $-\frac{1}{4}$, 0, $\frac{1}{2}$, 0, $-\frac{1}{4}$, with the middle tap being the current pixel undergoing decoding and two pixels on either side. In another implementation, the chroma band pass filter (128) will be a wide band pass filter with a pass band of around 3 MHz centered around the sub-carrier frequency.

Based on the detected motion in the motion detection block (118), the blender (110) decides whether to output the 2D chroma signal or the 3D chroma signal. If motion is present, the 2D_C signal is output, and if no motion is present, then the 3D_C signal is output from the blender (110). The signal from the blender goes to a color killer (132) that operates to remove chroma information in cases where the proper color cannot be displayed for various reasons, such as for monochrome inputs that lack a color burst signal, and so on. Finally the separated chroma (C) and luma (Y) signals are output to the television set for generation of RGB signals to be displayed on the television screen.

Low Frequency Motion Detection

Figure 4A:
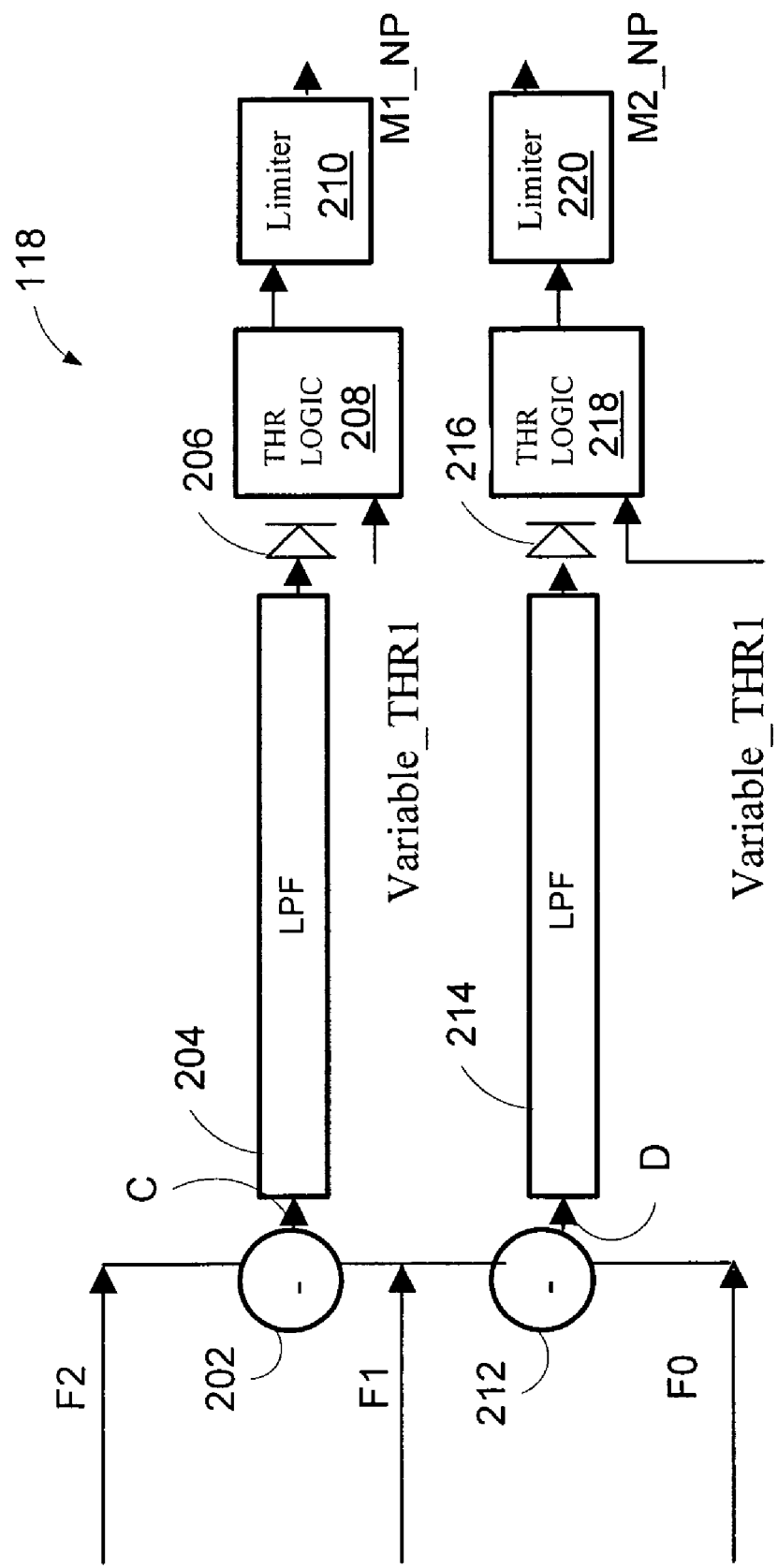
FIG. 4A shows a schematic block diagram of circuitry for detecting low frequency motion.
Figure 4B:
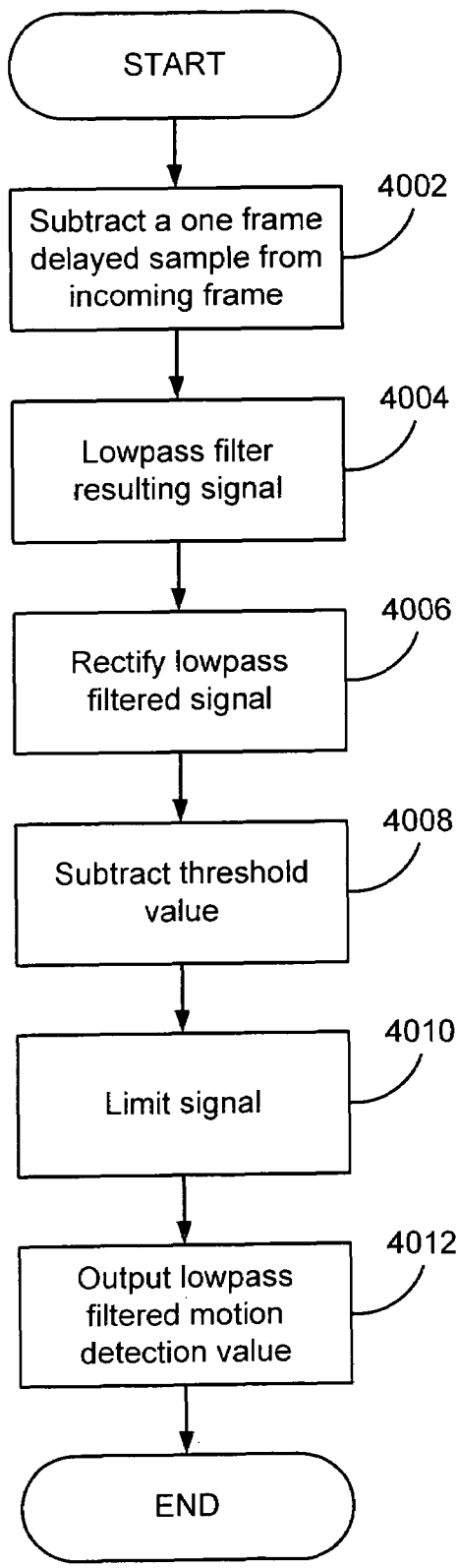
FIG. 4B shows a flowchart of a low frequency motion detection process.

FIG. 4A shows a schematic block diagram of the logic used in one implementation of the motion detection block (118) to detect low frequency motion. FIG. 4B shows a corresponding flowchart for the low frequency motion detection process that is carried out in the motion detection block (118) of FIG. 4A. The low frequency motion is determined by subtracting (202) a one frame delayed sample from an incoming frame, that is, F1-F0 (step 4002). As was discussed above, in NTSC, the sub-carrier for two adjacent frames is 180 degrees out of phase. Since the chroma signal is modulated on the sub-carrier, the result of the subtraction of frames F2 and F0 is that luma is canceled out and chroma and motion is obtained. The signal (C) resulting from the subtraction F2-F1 is lowpass filtered (204) in order to remove the high frequency components including chroma (step 4004). The same signal (C) is also used as input to the logic used to detect high frequency motion for chroma and/or luma, with less luma motion, which will be discussed in more detail below with reference to FIG. 6.

In one implementation, the lowpass filter (204) includes three 5-tap filters (2+2) with coefficients of $\frac{1}{4}$, 0, $\frac{1}{2}$, 0, $\frac{1}{4}$, and a 3-tap lowpass filter (1+1) with coefficients of $\frac{1}{4}$, $\frac{1}{2}$, $\frac{1}{4}$ at the output. This combination of filters in the lowpass filter (204) helps in reducing noise in the motion path and removes sub-carrier portions that may be incorrectly interpreted as motion. The lowpass filtered signal is then passed to a rectifier (206), which converts negative signals or values to positive signals or values (step 4006), and is then passed to a threshold logic block (208). The threshold logic block (208) subtracts the threshold value determined by the variable threshold logic (120) from the incoming rectified motion value (step 4008). The resulting signal is limited (210), that is, any negative values are clipped to zero while leaving positive values unchanged, to obtain the low frequency motion value (step 4010), and the lowpass filtered motion detection value is output (step 4012).

In one implementation, the third 5-tap filter has a bypass option. The attenuation of the lowpass filter block (204) for NTSC signals can be found in Table 1 below, and the attenuation for PAL signals are listed in Table 2 below.

TABLE 1

Attenuation for NTSC signals

| Frequency | Attenuation |
| --- | --- |
| 2 MHz | −25 dB |
| 3 MHz | −80 dB |
| 4 MHz | −100 dB |
| 4.5 MHz | −60 dB |
| 5 MHz | −40 dB |

TABLE 2

Attenuation for PAL signals

| Frequency | Attenuation |
| --- | --- |
| 2 MHz | −15 dB |
| 3 MHz | −40 dB |
| 4 MHz | −100 dB |
| 5 MHz | −95 dB |
| 6 MHz | −46 dB |

In one implementation, in order to make the switching to 3D softer, the same low frequency motion detection is applied to a one-frame delay and a two-frame delay, respectively, shown in FIG. 4A by blocks 212 through 220. Also here, the signal (D) resulting from the subtraction of signal F1 from F0 is used as input to the logic for detecting high frequency motion for chroma and/or luma, with less luma motion, shown in FIG. 6A. The maximum value of the F2-F1 motion and the F1-F0 motion, respectively, is determined as the final low frequency luma motion.

High Frequency Motion Detection for Chroma and/or Luma

Figure 5A:
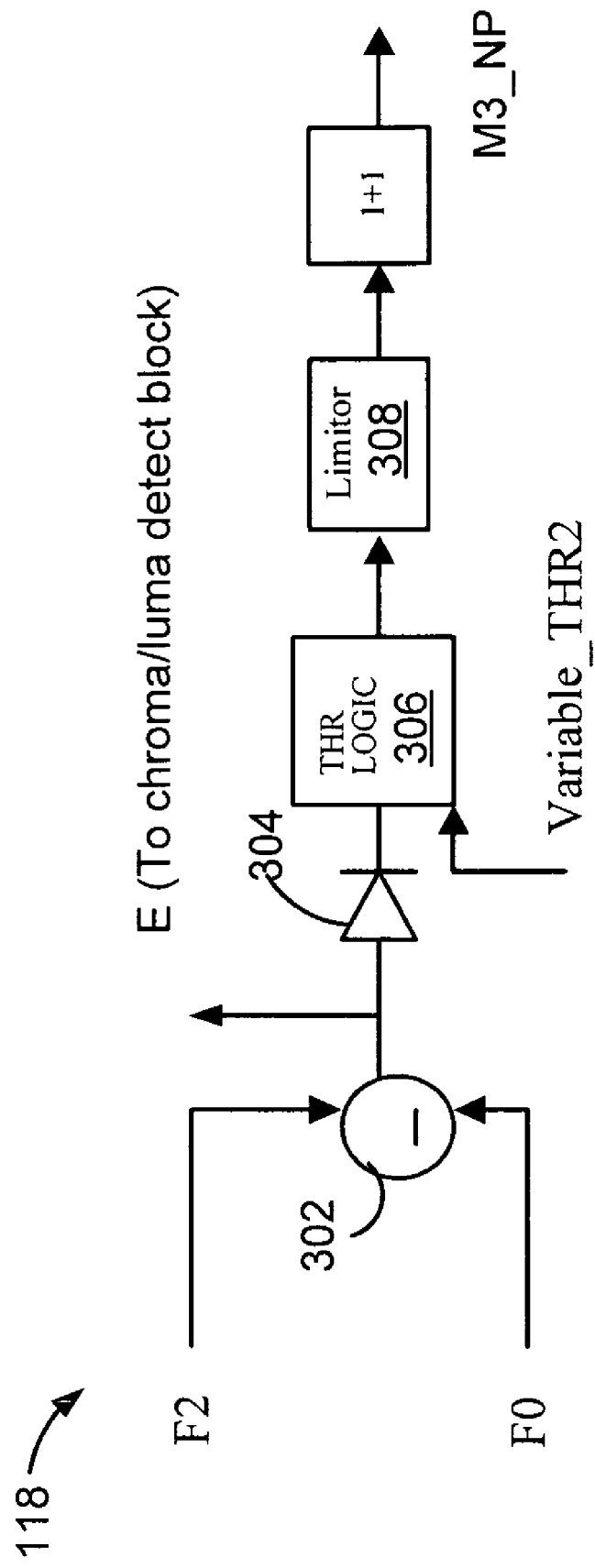
FIG. 5A shows a schematic block diagram of the logic used to detect high frequency motion for chroma and/or luma.
Figure 5B:
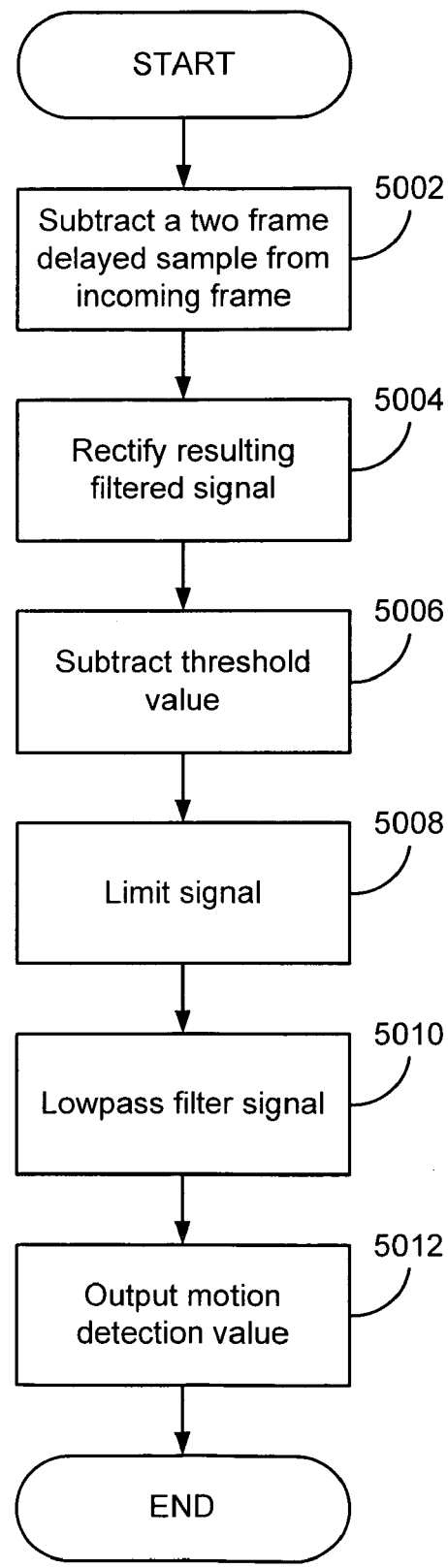
FIG. 5B shows a flowchart of a motion detection process for high frequency chroma and/or luma.

FIG. 5A shows a schematic block diagram of one implementation of the logic used in the motion detection block (118) to detect high frequency chroma and/or luma motion. FIG. 5B shows a corresponding flowchart of a motion detection process for high frequency chroma and/or luma. As can be seen in FIGS. 5A and 5B, in order to detect high frequency motion, a two-frame delayed sample is subtracted (302) from an incoming frame, that is, F2-F0 (step 5002). The resulting signal is then rectified (304) (step 5004) and passed to a threshold logic block (306). The threshold logic block (306) subtracts a second threshold value (step 5006) determined by the variable threshold logic (120) from the incoming motion value. The resulting signal is limited (308) (step 5008) and low pass filtered with a 3-tap low pass filter (1+1) with coefficients of ¼, ½, ¼ (step 5010). Since the sub-carrier of F0 and F2 has the same phase, this detection scheme provides proper chroma motion, as well as high frequency luma motion. The resulting signal is then output (step 5012).

In one implementation, the signals F2 and F0 can be bandpass filtered before they are subtracted in step 5002, so that low frequency luma motion is filtered out and only chroma band motion is present. As a result, the resulting signal output in step 5012 will only contain chroma band motion.

Chroma/Luma Motion with Less Luma Motion

Figure 6A:
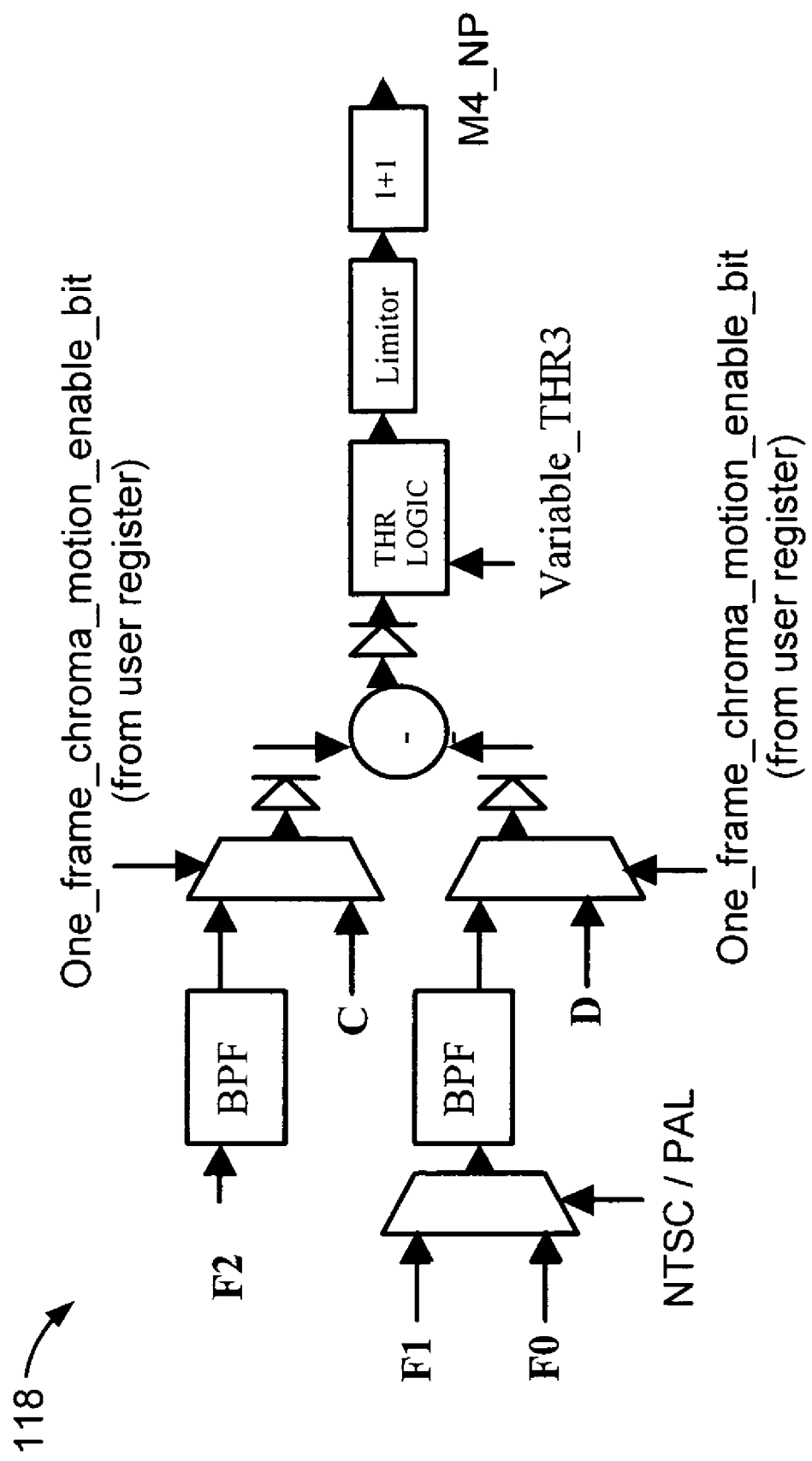
FIG. 6A shows a schematic block diagram of the logic used to detect high frequency motion for chroma and/or luma, with less luma motion.
Figure 6B:
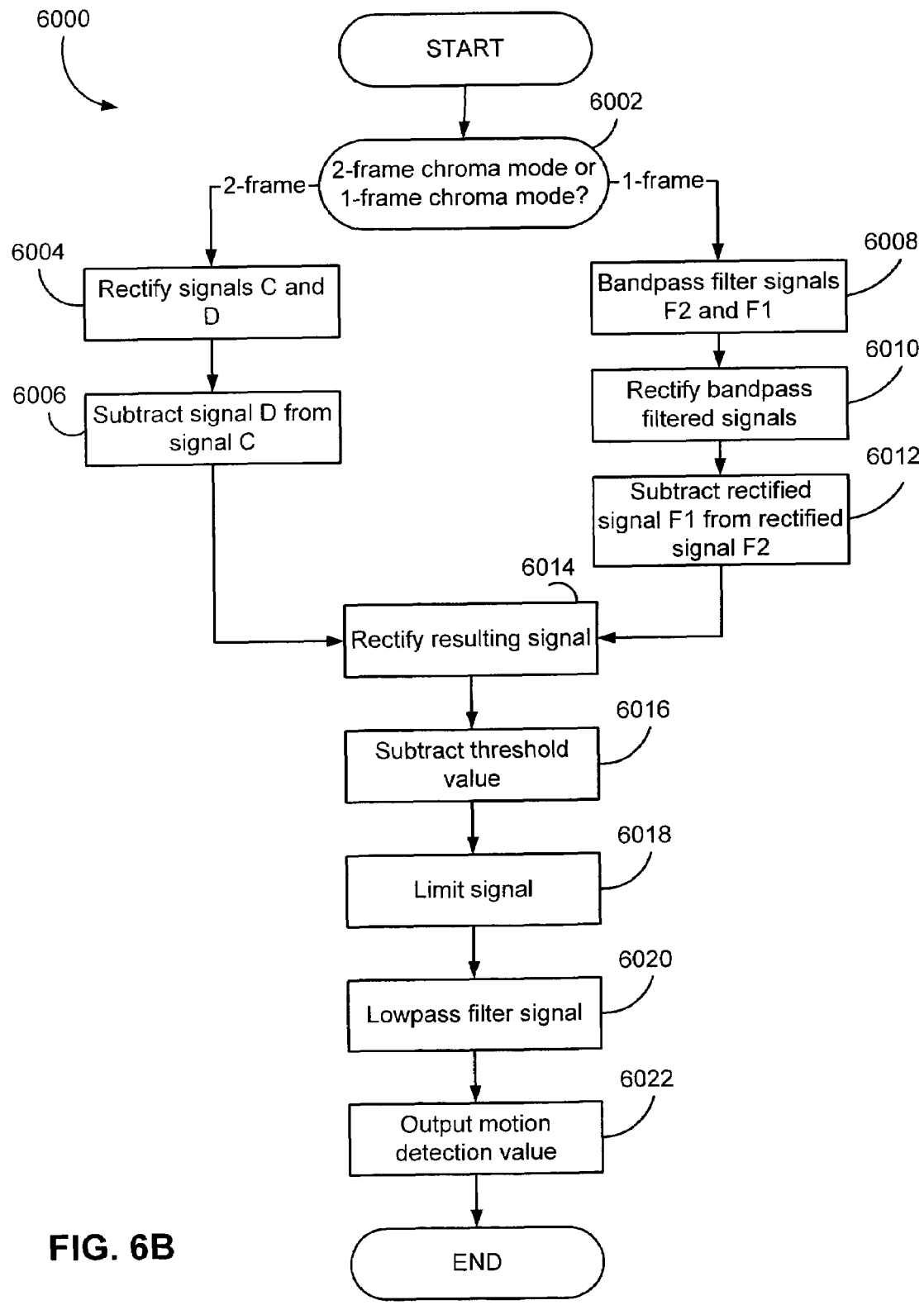
FIG. 6B shows a flowchart of a motion detection process for high frequency chroma and/or luma with less motion.

FIG. 6A shows a schematic block diagram of the logic used in the motion detection block (118) to detect high frequency motion for chroma and/or luma, with less luma motion. FIG. 6B shows a flowchart of a corresponding motion detection process carried out in the motion detection block (118). As can be seen in FIGS. 6A and 6B, this motion estimation is fairly similar to the high frequency motion estimation discussed above with reference to FIGS. 5A and 5B. The logic shown in FIG. 6A can operate in two modes. In the first mode, the logic operates to detect chroma motion across two frames, with less luma motion. In the second mode, the logic operates to detect one frame chroma motion.

First, the process (6000) determines whether the two-frame chroma mode or the one frame chroma mode should be used (step 6002). In one implementation, this is determined by checking whether a one-frame chroma motion enable bit has been set. If the one-frame chroma motion enable bit has not been set, then the two-frame mode is used and the process continues to step 6004, in which the two one-frame difference signals C (that is, F2-F1) and D (that is F1-F0) from FIG. 4A are rectified. Signal D is then subtracted from signal C (step 6006) and the resulting signal is rectified (step 6014). The threshold logic block then subtracts a third threshold value determined by the variable threshold logic (120) from the incoming rectified motion value (step 6016). The resulting signal is limited (308) (step 6018) and low pass filtered (step 6020) in a 3-tap low pass filter (1+1) with coefficients of ¼, ½, ¼. The resulting signal is then output (step 6022) and the process ends.

If the process determines in step 6002 that the one frame chroma motion enable bit has been set, that is, that one frame chroma motion detection should be used, the process (6000) does not use signals C and D, but instead uses frames F2 and F1. Each of frames F2 and F1 are bandpass filtered (step 6008) and rectified (step 6010). The rectified version of signal F1 is then subtracted from the rectified version of signal F2 (step 6012), and the resulting difference signal is then rectified (step 6014). After the difference signal has been rectified in step 6014, the process continues with steps 6016 through 6022, as described above.

Final Motion

Figure 7:
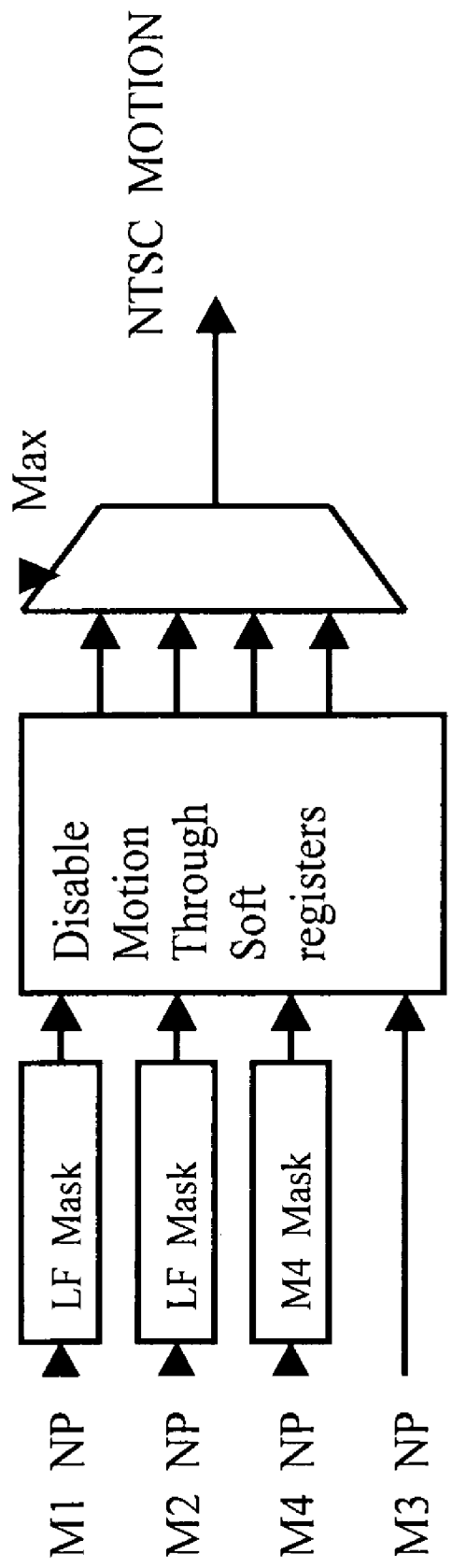
FIG. 7 shows a schematic block diagram of how NTSC motion is determined.

FIG. 7 shows a schematic block diagram of how the final NTSC motion is determined based on the motions determined for the different frequency regions. The final motion file is the maximum of the motions determined above for the various frequency areas. As was seen in FIG. 2 above, the final motion is then passed through a 3-tap horizontal median filter (122). The 3-tap horizontal median filter (122) removes sparkle motion and no_motion points and/or lines. The final NTSC motion is clipped to be 5 bits wide. A maximum motion value of 16 will cause the decoder to output the 2D luma and chroma signals only. A minimum motion value of zero will cause the decoder to output the 3D luma and chroma signals only. Any values in between zero and 16 will cause the decoder to output a signal that is a blended 2D and 3D signal. This blending is done in the blender (110), which will now be described in greater detail.

The Blender

Figure 8:
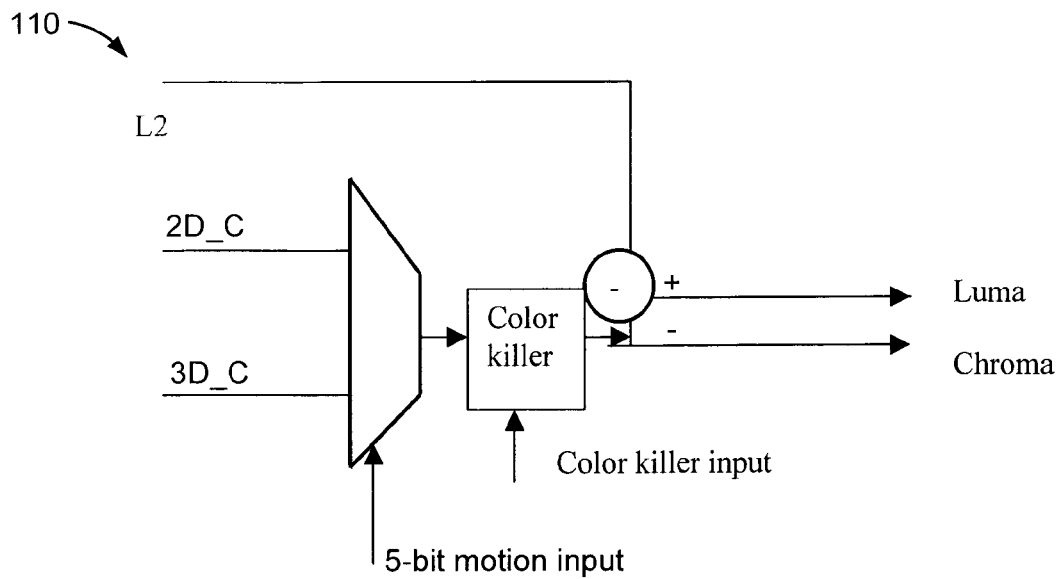
FIG. 8 is a schematic block diagram showing the operation of the blender (110) of the decoder in greater detail

FIG. 8 is a schematic block diagram showing the operation of the blender (110) of the decoder in greater detail, in accordance with one implementation of the invention. As was discussed above and can be seen in FIG. 8, the 2D chroma signal (2D_C) comes from the 2D chroma/luma separator, and the 3D chroma signal (3D_C) comes from the 3D chroma/luma separator. The 5-bit motion output from the motion detection block (118) is also used as an input to the blender (110). The chroma output from the blender is based on the 2D_C and 3D_C signals, which are blended as follows:

Chroma output=(2D_C*motion)/16+
(3D_C*(16-motion))/16

The luma output is obtained by subtracting the chroma output from the input composite video (L2). A color killer, which can be enabled and disabled by firmware, is used to remove color from being displayed in cases where the proper color cannot be displayed, for example, when the input composite video (L2) is a monochrome video signal. In some implementations, a filter, such as an adaptive controlled filter, can be applied in the chroma path in order to enhance the cross-color suppression. Similarly, adaptive filters can be put in the luma path in order to reduce cross-luma effects.

Threshold Logic for Motion Detection

As was discussed above, an effective way of decoding the composite signal is to perform motion based adaptive temporal decoding with a 3D comb filter, such that when no motion is present, then temporal combing (3D) is performed, and otherwise spatial combing (2D) is performed. 2D decoding has cross-color and dot crawl artifacts, while 3D decoding does not have these artifacts for still portions of an image. Thus, the motion detection logic is used to accurately detect the motion and thereby achieve a better image quality.

In one implementation, the motion detection is achieved by studying differences between a current frame and previous frames on a pixel-by-pixel basis. The detected difference, that is, the "raw difference" needs to be processed in order to detect true motion. Typically, motion detection logic contains some type of threshold logic, which controls how much raw motion will be suppressed based on system noise. If this threshold value is increased, then the real motion will be lost in some cases, and if the threshold value is decreased, system noise will generate erroneous motion indications. Therefore, it is desirable to have adaptive threshold logic. Furthermore, the more dynamic the adaptive threshold logic is, the better the motion detection logic will perform. In order to understand the various issues that need to be taken into account in the adaptive threshold logic, a brief overview of various noise types will now follow.

The main causes for motion detection inaccuracies are random noise, sampling clock noise or jitter, diagonal transition noise due to camera shimmer, clamp noise and so on. The following discussion will focus on sampling clock noise or jitter, and diagonal transition noise. In addition to random low amplitude noise in video signals, the more high amplitude and high frequency noise for the 3D decoder motion detection logic is edge noise, which causes false motion across frames, and hence switching to 2D in those areas of the image, although 3D should be used. The edge noise occurs as a result of the ADC (Analog to Digital Converter) sampling clock jitter, because of various reasons like clock edge noise, PLL (Phase locked loop) instability, PLL tracking, or the loop filter settings.

As a result of the sampling clock jitter, there are variations in the sampled signal amplitudes at all the signal edges. These variations cause edge noise to be present, which is directly proportional to clock jitter and to the edge amplitude or the slope, that is, the difference in pixel values for two pixels that are located on either side of an edge. In one implementation this difference is determined by determining a first difference of a current pixel and a previous pixel, and a second difference between a current pixel and a next pixel, and selecting the maximum of the two determined differences. In order to address this problem, the threshold needs to be dynamically varied based on both edge detection and on the edge slope, on a pixel-by-pixel basis.

The edge/slope adaptive threshold can be further improved based on sub-carrier detection. Typically in a digitized composite video signal, the edge noise in the high frequency luma portions is higher than the edge noise in the high frequency chroma portions, since the sampling clock is locked to the color burst portion of the sub-carrier signal. Furthermore, the luma edges typically have steeper slopes than the chroma edges, since the luma edges have high resolution up to around 5 MHz. If the edge threshold is set high to mask high frequency luma edge noise, then some associated loss of real chroma motion will also occur. However, if the edge/slope threshold is made adaptive based on sub-carrier detection, the threshold logic can be improved to be more effective, as will now be discussed.

Figure 9:
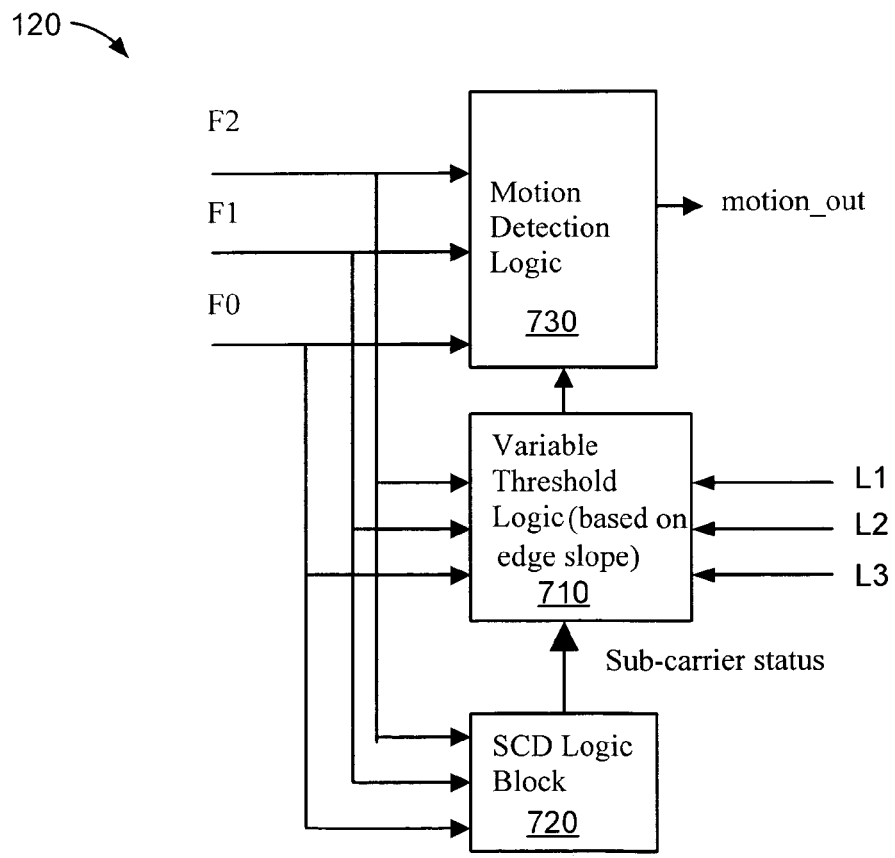
FIG. 9 is a schematic block diagram showing the adaptive threshold logic (120) of the decoder.

Implementation of Edge and Sub-Carrier Detect Logic for Adaptive Threshold Logic FIG. 9 shows a schematic block diagram of the threshold logic (120) that includes an edge detection logic block (710) and sub-carrier detection (SCD) logic block (720). The edge detection logic block (710), which will be described in further detail below, contains logic that allows a user to set a threshold value as a percentage of the edge, that is, how much of the slope amplitude should be assigned as an edge threshold.

This edge-based threshold is then made further adaptive through the SCD logic block (720), which examines the sub-carrier status. The SCD logic block (720) will also be described in further detail below, but generally the SCD logic block (720) operates and interacts with the edge detection logic block (710) as follows. A user may set two percentages for a particular edge, for example, x % and y %. If the SCD logic block (720) does not detect a sub-carrier, then x % is used as the slope percentage threshold value, and if the SCD logic block (720) detects a sub-carrier, then y % is used as the slope percentage threshold value for that particular edge. If x % is set to be higher than y %, a higher slope percentage threshold value can be used for luma portions of an image and a lower slope percentage threshold value can be used for chroma portions of the image, thereby reducing the chroma motion loss and achieving a dynamic threshold variation based on SCD on a pixel by pixel basis. Because of this independent control for luma and chroma portions, the threshold logic can be programmed to suppress significant luma edge noise without much loss in chroma motion.

The SCD Detection Block

The SCD detection block (720) detects the sub-carrier by checking for sub-carrier characteristics, both spatially (i.e., across lines) and temporally (i.e., across frames). In the spatial domain, since the sampling clock is four times the sub-carrier frequency and locked to the sub-carrier through the color burst, the alternate sub-carrier samples will be nearly equal in magnitude, but opposite in phase or sign. Furthermore, the sub-carrier changes phase by 180 degrees across lines, which can also be used. In the temporal domain, the sub-carrier inverses phase by 180 degrees every frame, so there will be a significant difference between two adjacent frames and much less difference between frames that are two frames apart. Thus, by studying both the spatial domain and the temporal domain, an approximate sub-carrier detection can be made to control the threshold logic. As can be seen in FIG. 9, the SCD block (720) receives the three frame taps F2, F1, and F0 (that is, the current frame, the previous frame, and the frame prior to the previous frame) for sub-carrier detection. The definitions provided below are useful for the subsequent description of the SCD detection block:

1. The CLD_Status1_A is the status signal, based on temporal chroma amplitude characteristics check, to indicate whether the samples are chroma or not;
2. The CLD_status1_B is the status signal, based on temporal chroma polarity characteristics check, to indicate whether the samples are chroma or not;
3. The CLD_status2_A is the status signal, based on spatial chroma amplitude and polarity check within the current Video Line (one dimensional), to indicate whether the samples are chroma or not;
4. The CLD_status2_B is the status signal, based on spatial chroma amplitude and polarity check across three lines (which are one line delayed apart for NTSC and two line delayed apart for PAL)(i.e. two dimensional), to indicate whether the samples are chroma or not; and
5. The final cld_status1,2,3 each can be any combination of the above CLD_status1_A/B,2_A/B status signals. These three independently programmable status signals are supposed to control the motion thresholds for three motion paths, the viz.Low freq luma motion path, High freq Luma motion path, Chroma motion path.

It should be noted that the CLD status signals can be either a single or multiple bit wide signal.

CLD_Status1 (Temporal Domain Check)

Figure 10:
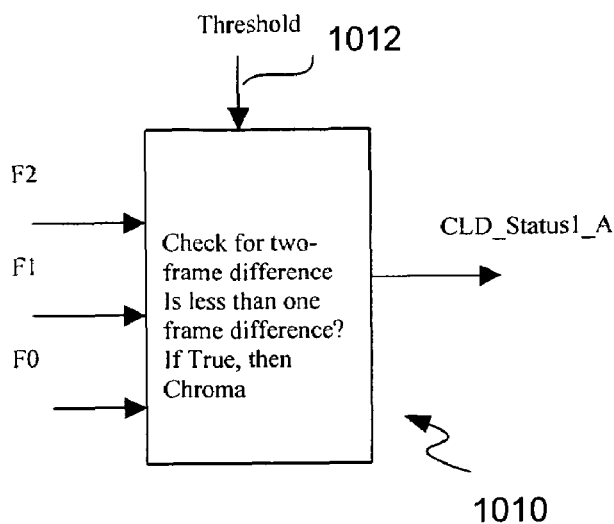
FIG. 10 is a diagram of a temporal detection block that checks for temporal Chroma characteristics.
Figure 11:
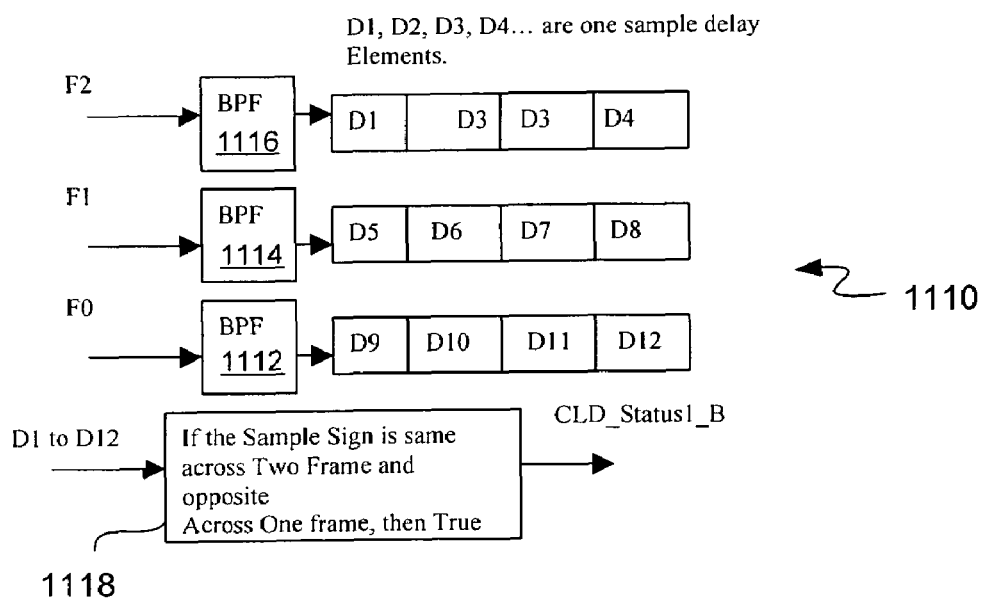
FIG. 11 is a diagram illustrating the spatial detection block

Referring to FIG. 10, a diagram of a temporal detection block 1010 in the SCD logic block 720 that checks for temporal Chroma characteristics is shown. The temporal detection block 1010 receives the three signals F0, F1 and F2 and a threshold input 1012. The temporal detection block 1010 checks for temporal Chroma characteristics by analyzing the Chroma amplitude across two frames and then across one frame. In an alternative embodiment, the Chroma amplitude can be checked based on temporal sign/polarity. The output of the temporal detection block 1010 is designated as CLD_Status1 A, indicative of the outcome of the temporal check performed by the temporal detection block 1010. CLD_Status1 A is therefore Chroma amplitude based. Referring to FIG. 11, a diagram illustrating the temporal detection block 1110 in the SCD logic block 720 is shown. The temporal detection block 1110 includes three band pass filters (BPF) 1112, 1114, and 1116 which receive the signals F0, F1 and F2 respectively. The outputs of the three BPFs 1116, 1114 and 1112 are provide to three sets of delay elements designated (D1, D2, D3 and D4), (D5, D6, D7 and D8), and (D9, D10, D11 and D12) respectively. The outputs of the delay elements D1 through D12 are provided to logic block 1118 which generates the output CLD Status1_B. If the sample sign is the same across two frames and opposite across one frame, then the output CLD Status1_B is True. The CLD Status1_B is therefore temporal polarity based.

CLD_Status2 (Spatial Domain Check)

Figure 12:
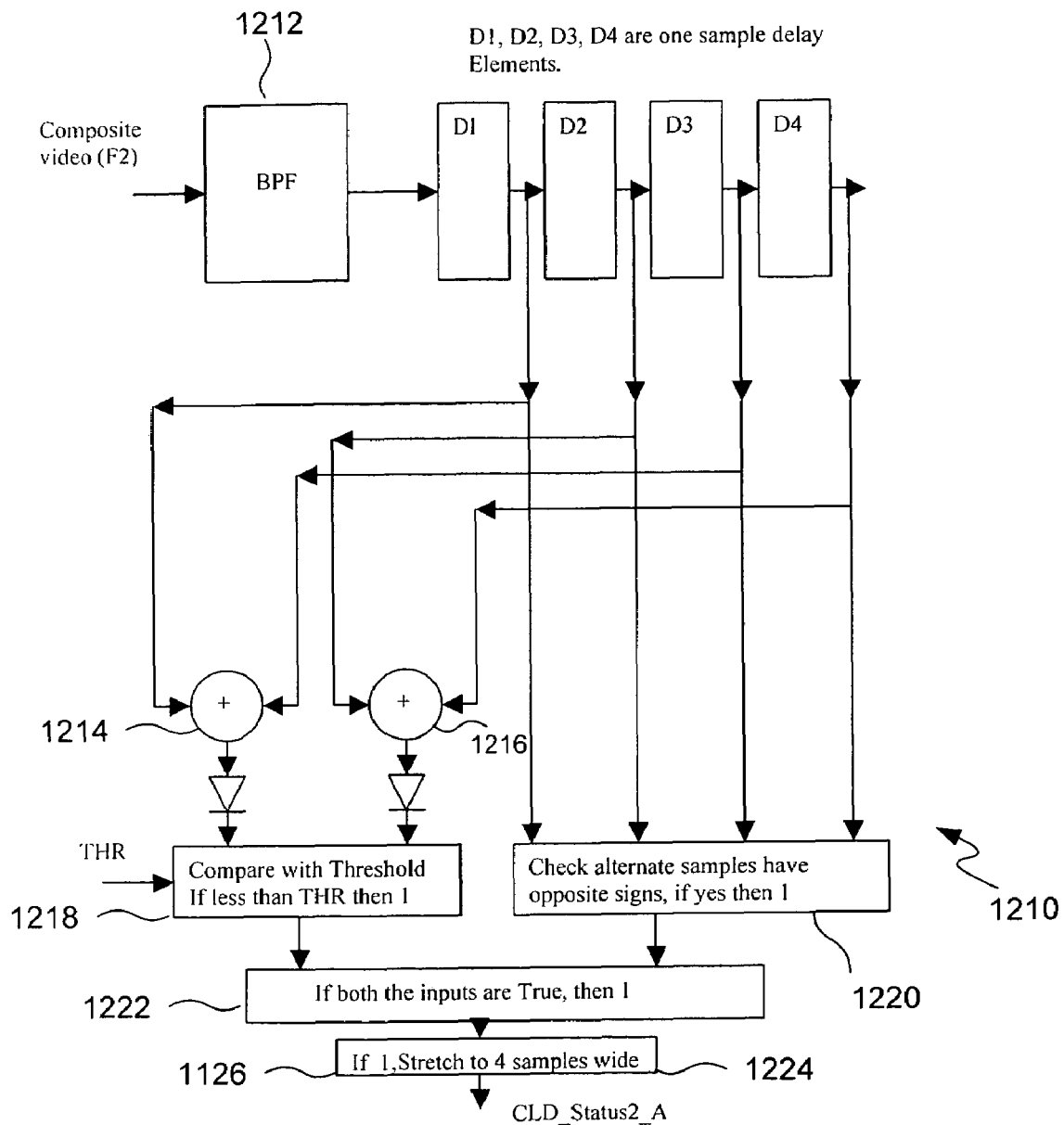
FIG. 12 is a diagram illustrating a detection block that checks for spatial Chroma characteristics is shown.

Referring to FIG. 12, a diagram illustrating a detection block 1210 that checks for spatial Chroma characteristics is shown. This block checks for Chroma characteristics spatially, by looking at four adjacent samples in the 4fsc locked video stream and checks for the Chroma amplitude and Sign of the four samples in the window. The detection block 1210 includes a bandpass filter (BPF) 1212 that receives a composite video signal (e.g., F2). The output of the BPF 1212 is proved to four delay elements D1, D2, D3 and D4 respectively. The output of delay elements D1 and D3 are added by a summation device 1214 and the output of delay elements D2 and D4 are added by summation device 1216 respectively. The output of the two summation devices 1214 and 1216 are rectified and compared with a threshold (THR) at logic block 1218. The threshold THR is a value stored in a controllable register and is set by the user. The output of the logic block 1218 is a logic one if both the outputs from the summation devices 1214 and 1216 are less than the THR. Otherwise, the output is low. Another logic block 1220 receives the outputs from delay elements D1 through D4. The logic block 1220 checks the alternative samples received by the delay elements D1 through D4. If the alternative samples have opposite signs, then the output of logic block 1220 is a logic one. Otherwise, the output is zero. If both the outputs of the logic blocks 1218 and 1220 are a logic one, then the output of a logic block 1222 is also high. If one or both of the inputs to logic block 1222 are low, then the output is low. Finally, in logic block 1126, if the output of logic block 1222 is a logic one, then stretch this status to four samples wide else no stretch. The output of the detection block is CLD status2_A, which is indicative of the chroma luma status of the current line in the spatial domain. If the status is one, then the CLD status2 is considered the chroma status. Otherwise it is considered the luma status. The block 1218 is a compare circuit which compares the input rectified chroma amplitude difference signals with the user programmable threshold THR. The block 1220 checks the sign of the alternate samples for opposite polarity (i.e. checks the signs of the D1 and D3 samples for opposite polarity and also the signs of D2 & D4 samples for opposite polarity. If true, a logic one is output. The block 1222 is a logical AND circuit. The block 1126 is similar to FIG. 19 flip-flop section, which does the signal stretch if the status is logic one.

Figure 13:
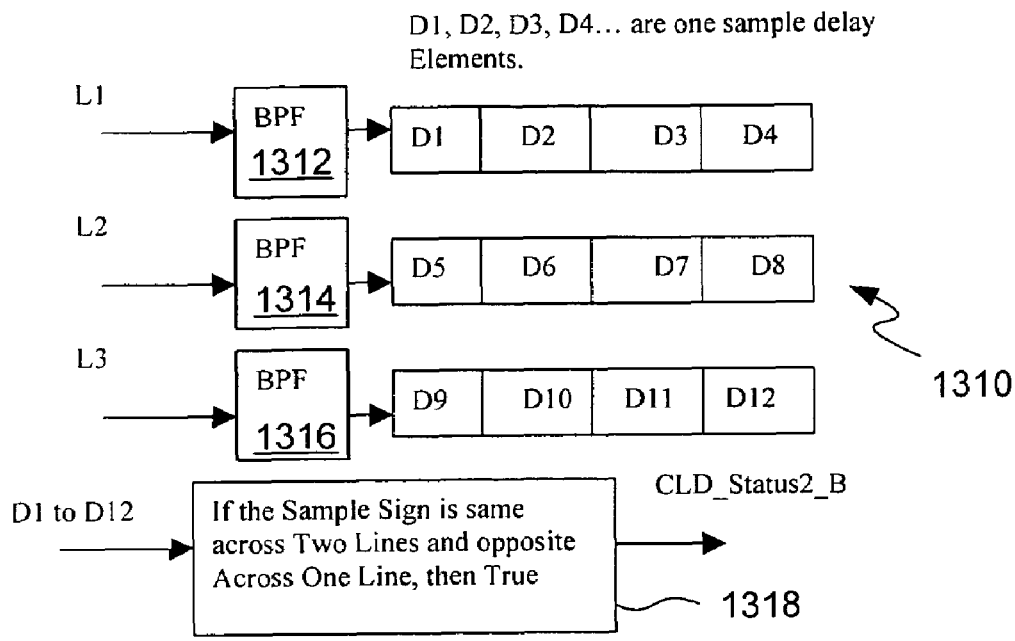
FIG. 13 is another detection block for detecting line Chroma characteristics.

The CLD_status2 can also be based on the adjacent line Chroma characteristics check. Referring to FIG. 13, another detection block 1310 for detecting line Chroma characteristics is shown. The detection block 1310 includes three bandpass filters (BPFs) 1312, 1314 and 1316 configured to receive three line delayed samples L1, L2 and L3 respectively. Each of the delayed line samples L1, L2 and L3 are delayed line samples from the same field. The outputs of the three BPFs 1312, 1314 and 1316 are provided to three sets of delay elements (D1, D2, D3 and D4), (D5, D6, D7 and D8) and (D9, D10, D11 and D12) respectively. A logic block 1318 is configured to receive the outputs of the delay elements D1 through D12.

The output of the logic block 1318 is a logic one if the sample sign is the same across two lines and opposite across one line. In other words, if the sample sign across two lines is same, (i.e. the current sample and the two line delayed sample are both positive or both negative samples) and opposite across one line (i.e. the current sample and the one line delayed sample have opposite signs). This is because after the 4fsc composite video signal is bandpass filtered, the output of the BPF is signed 4fsc samples.

Figure 14:
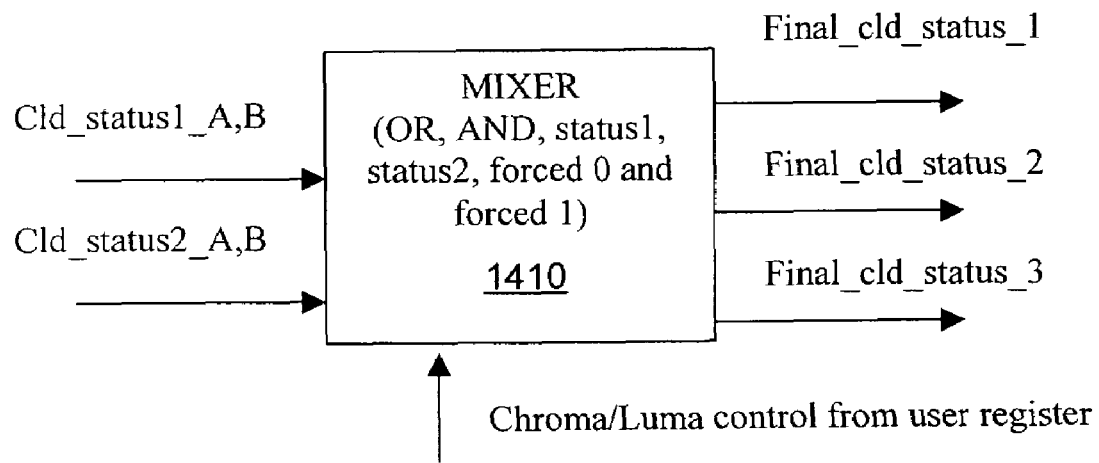
FIG. 14 is a logic block that generates motion control threshold signals.

Referring to FIG. 14, a logic block that mixes the status signals Cld-status1 A,B and Cld-status2_A,B is shown. The logic block 1410 generates three status outputs Final_cld_ status_1, Final_cld_status_2, and Final_cld_status_3 from the received inputs and a Chroma/Luma control signal. The three status output signals Final_cld_status_1, Final_cld_status_2, and Final_cld_status_3 can each be independently set to any combination of the input signals Cld-status1 A,B and Cld-status2_A,B. The three output status signals are each capable of controlling three different motion path threshold controls, such as the low frequency motion path, the high frequency Chroma motion path, and the two frame motion path for example. The logic block 1410 is a programmable mixer which performs a number of different mixing functions. For example, the cld_status_1 output can be derived from the following: (i) the Logical AND of CLD_Status1_A AND CLD_Status1_B; (ii) the Logical AND of CLD_status1_A AND CLD_status2_A; (iii) the Logical AND of CLD_status2_A AND CLD_status2_B; or (iv) the Logical AND of CLD_status1_A,B and CLD_status2_A,B. In addition, each of the above combinations of inputs can be combined with a Logical OR instead of the Logical AND operation. Finally, the outputs of the final_cld_status_1, final_cld_status_2, and final_cld_status_3 signals can be individually set to be either a logic one or logic zero respectively.

The Variable Threshold Logic Block

Figure 15:
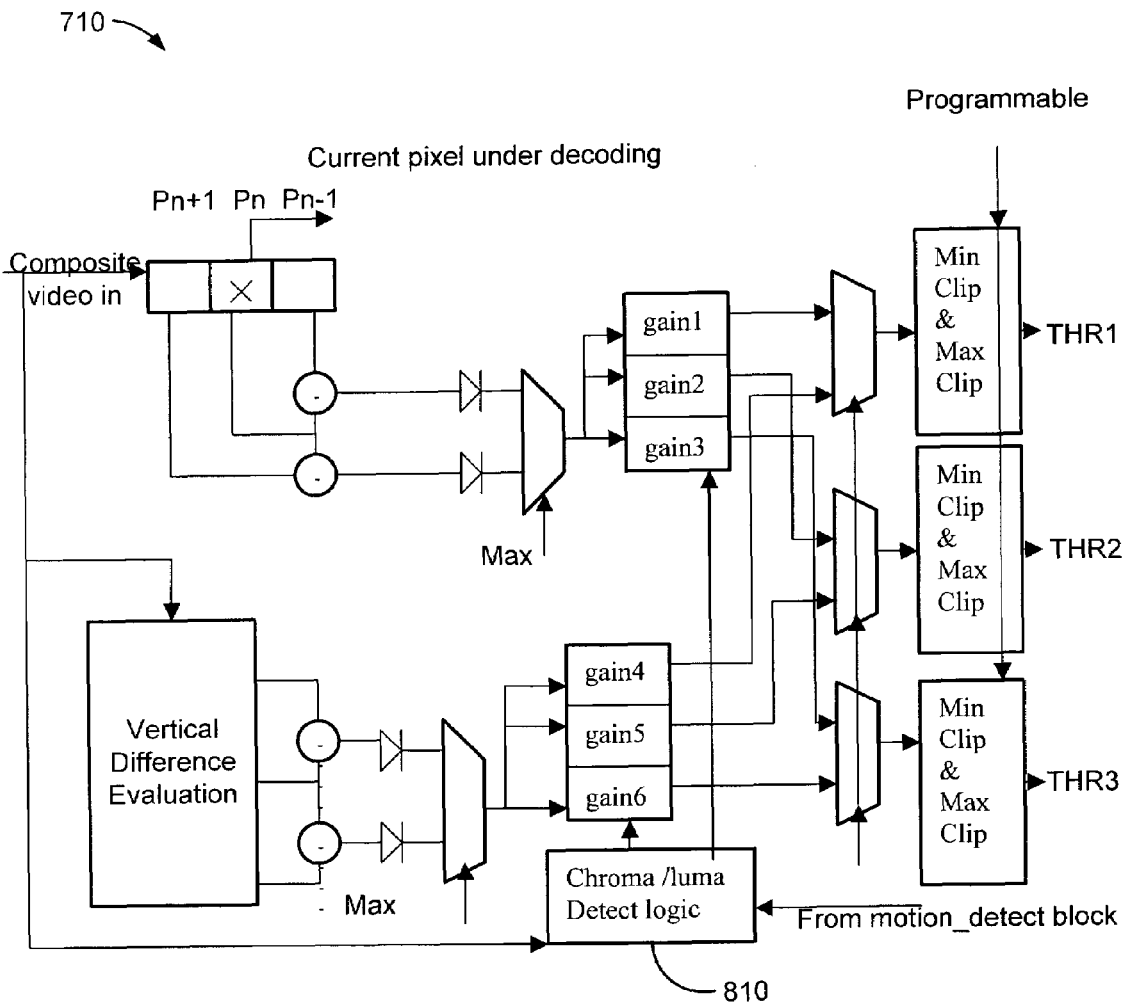
FIG. 15 is a schematic block diagram showing the variable threshold logic block (710) of the adaptive threshold logic (120) in greater detail.

FIG. 15 shows a schematic block diagram of the variable threshold logic block (710). As can be seen in FIG. 15, the composite video signal comes in, and a current pixel (Pn) is selected, for which variable thresholds are to be determined. The logic compares the current pixel (Pn) with a previous pixel (Pn−1) and a next pixel (Pn+1) in the horizontal direction, and selects the maximum difference, as was described above. This difference describes the detected maximum slope amplitude. A corresponding determination is also made in the vertical direction in the Vertical Difference Evaluation block by selecting the current pixel (Pn) for a current line, and the pixel in the same position in a previous line and a next line, respectively. Once the maximum horizontal and vertical slopes, respectively, have been determined, a set of threshold values for the current pixel is generated. The threshold values are linearly proportional to the detected slope value. The proportionality constant can be varied. In some implementations the threshold values can be non-linear with respect to the detected slope value. Also, minimum and maximum clipping functions can be programmed to act on the calculated thresholds so that the final threshold values can be programmed to have some minimum thresholds or be programmed not to exceed some upper limit. In one implementation, the variable threshold logic block (710) can determine threshold values for several adjacent frames, such as F2, F1 and F0 and determine the final threshold value to be the maximum or minimum value determined for the respective frames.

The variable threshold logic helps in removing false motion because of pixel value variations at signal edges due to sampling clock jitter/variations. The higher the signal edge, the larger the variation will occur for the same amount of jitter. Therefore, the pixels that are located on a steeper slope should have a higher threshold value. At the same time, at these edges the motion value is high, so the threshold will not mask the real motion. The variable threshold is generated by taking a percentage, for example, 10% of the slope that the pixel is located on. This percentage is further adaptively determined based on the color burst variance measures (that is, samples that are two frames apart).

Figure 16:
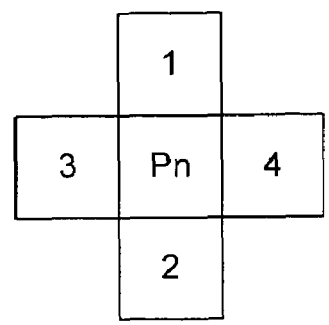
FIG. 16 shows an example of a 5-tap adaptive threshold window.

In one implementation, a 3-tap horizontal window is combined with a 3-tap vertical window to form a 5-tap adaptive threshold window. FIG. 16 shows an example of such a 5-tap adaptive threshold window. The current pixel under threshold determination is located in the middle of the respective windows. The absolute difference of the current pixel and the adjacent pixels are determined and the maximum difference among the determined differences is determined to be the slope. For example, in FIG. 16, the current pixel value Pn is compared with the values 1, 2, 3 and 4, respectively, which are the values of the surrounding pixels, and the maximum difference is taken as the final slope from which the threshold is derived for the pixel Pn. The percentage value is made adaptive based on luma/chroma pixel values, for example, x % or y % based on chroma/luma detection.

In one implementation a horizontal threshold value is computed in accordance with the following expression:

$$V_{thr}(\text{Horizontal}) = [[\text{Max}\{|Pn-(Pn-1)|, |Pn-(Pn+1)|\}] * (\text{Programmable attenuation})] + \text{Programmable } DC \text{ threshold (min level)}$$

In one implementation, the decoder can detect a synch edge or color burst regions and determine their motion variance, for example, by using firmware. This detected variance, which can be for one frame motion or two frame motion, can be used to program the linear percentage threshold value, that is the programmable threshold gain. The programmable variable threshold percentage gain can, additionally, be adapted based on detected chroma/luma. The threshold logic also has a programmable minimum DC offset. The max clipping logic clips the output level to the upper limit value if the threshold crosses the programmed upper limit value. The same logic has also been put in the vertical domain, i.e., across lines. As can be realized by one skilled in the art, the threshold percentage and the DC offset for horizontal and vertical taps can be separately programmed. Hence, since line memories are required for vertical logic, only the horizontal logic can be kept, unless the 2D-logic line memories can be shared. Finally, as can be seen in FIG. 9, the variable threshold value is subtracted from the motion value in the motion detection logic block (730) to generate a motion_out value.

Chroma/Luma Detect Logic

The chroma/luma detect logic block (810) of FIG. 15 coarsely detects the chroma/luma signals by checking for chroma characteristics/signature based on two factors. The first factor is based on 4fsc sampling. If the pixel under investigation is part of a chroma cycle, then every alternate sample should be nearly equal in magnitude, but be opposite in sign. After rectification, the absolute difference of adjacent pixels among the four chroma pixels should be nearly the same. The second factor is a chroma amplitude check. If the one-frame difference is greater than the two-frame difference for still images, then chroma is detected, and otherwise the pixel is not a chroma pixel.

Based on these two checks, it can be determined whether the pixel under decoding is on the chroma cycle or on the luma signal. Further, based on this determination, the variable threshold percentage is decided differently for chroma/luma pixels, for example, as 30% for luma and 10% for chroma. It should be noted that the threshold percentage (gain) and the DC offset min and max clip values are independently programmable for each motion path.

Figure 17:
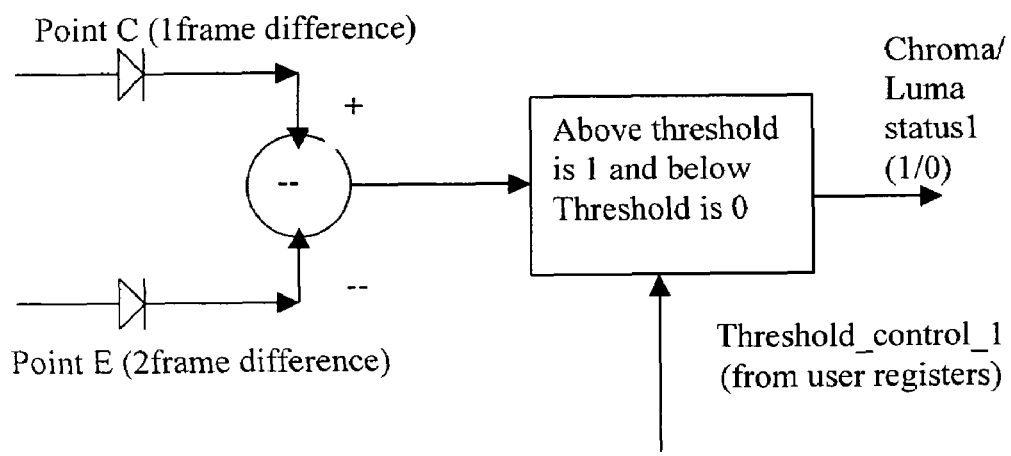
FIG. 17 is a schematic block diagram showing the logic used in the decoder to check the chroma amplitude temporally.
Figure 18:
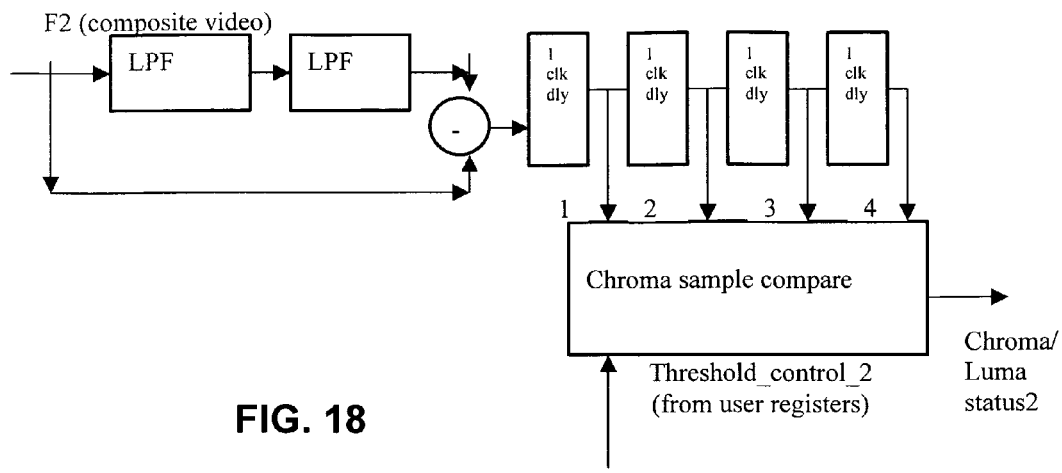
FIG. 18 is a schematic block diagram showing the logic used in the decoder to do a spatial check of the 4fsc sampling.
Figure 19:
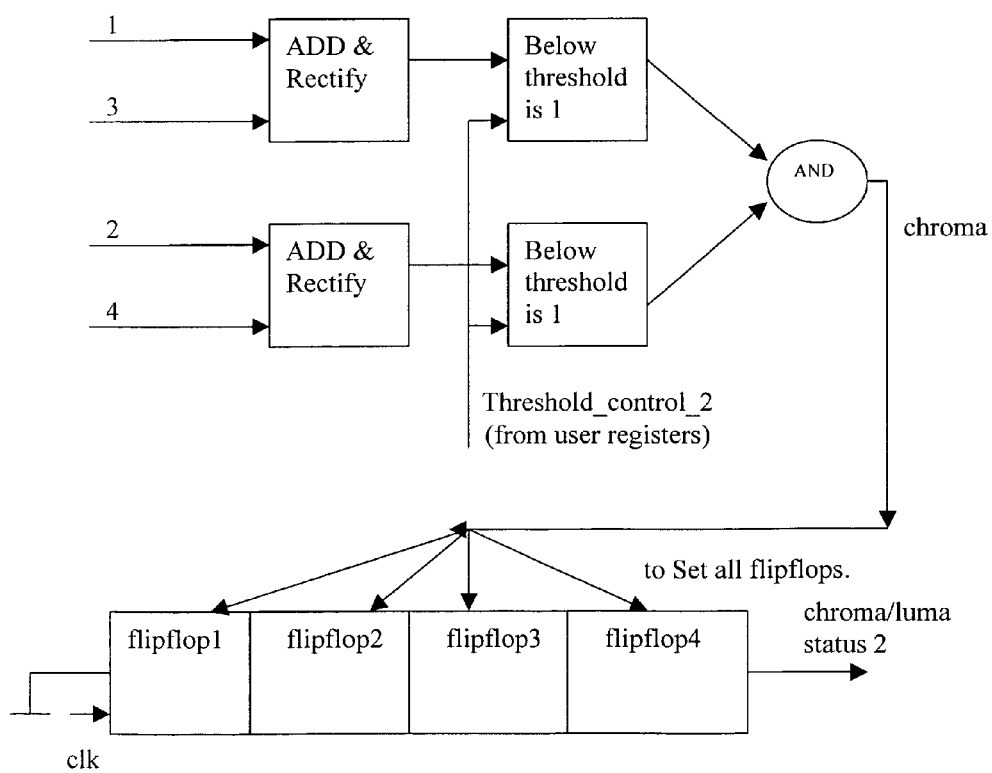
FIG. 19 is a more detailed view of the chroma sample compare block of FIG. 13.
Figure 20:
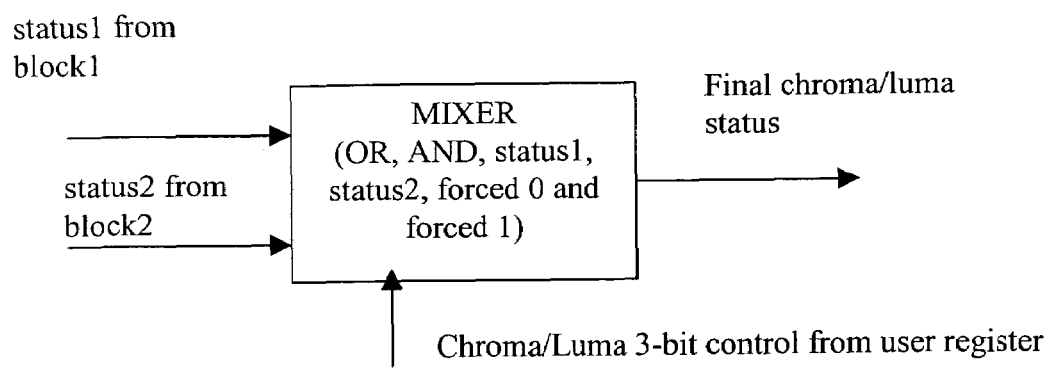
FIG. 20 shows how a final chroma/luma status value is generated that is used by the variable threshold logic block (710).

A more detailed view of the different parts of the chroma/luma detect logic (810) is shown in FIGS. 17-20. FIG. 17 shows the logic for the temporal chroma amplitude check, which checks the one-frame and two-frame differences, respectively, and outputs a first chroma/luma status value of one or zero, where a value of one represents chroma. FIG. 18 shows the logic for the 4fsc spatial sampling check, which checks whether every alternate sample is nearly equal in magnitude, but opposite in sign, and outputs a second chroma/luma status value of one or zero, where a value of one represents chroma. FIG. 19 shows a more detailed view of the chroma sample compare block of FIG. 18, where all the four flip-flops are set to one if chroma is detected. Finally, FIG. 20 shows how the first and second chroma/luma status values are compared to generate a final chroma/luma status value that is used by the variable threshold logic block (710).

Adaptations for PAL

PAL (Phase Alternating Line) is a video standard used, for example, in Europe, and differs from the NTSC standard in a number of ways. For the purpose of this present application, the most significant difference is that the sub-carrier is out of phase by 180 degrees across two frames, and not across one as in NTSC. Consequently, the sub-carrier is in phase every four frames. For PAL, the 3D chroma signal is generated by subtracting video signals that are two frames apart. The chroma motion is detected by using current, one-frame and two-frame delayed signals (i.e., the F2, F1, and F0 taps).

Figure 21:
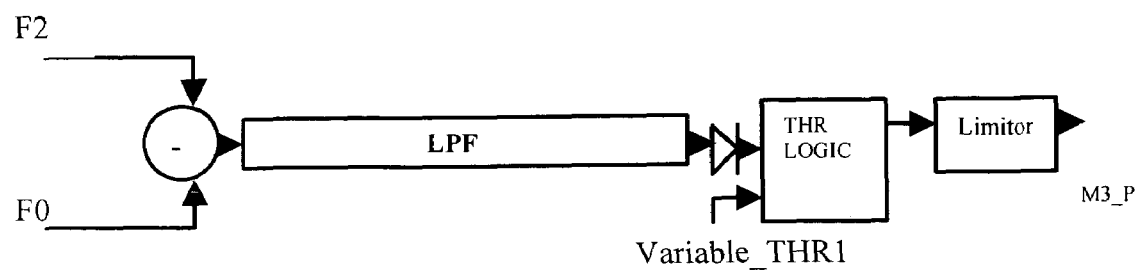
FIG. 21 is a schematic block diagram for detecting low frequency motion for PAL in the decoder.

FIG. 21 shows a schematic block diagram for detecting low frequency motion for PAL and is analogous to the detection of low frequency motion for NTSC, which was described above with respect to FIGS. 4A and 4B, except that for PAL only a two-frame difference is used.

Figure 22:
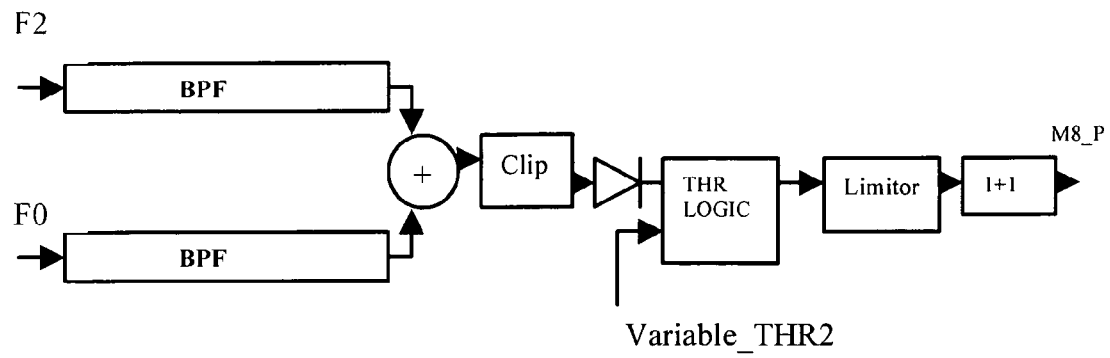
FIG. 22 is a schematic block diagram for detecting chroma motion for PAL in the decoder.

FIG. 22 shows a schematic block diagram for detecting chroma motion for PAL, and is analogous to the detection of chroma motion for NTSC, which was described above with respect to FIGS. 5A and 5B, except that for PAL the F0 and F2 signals are added and clipped, instead of subtracted.

Figure 23:
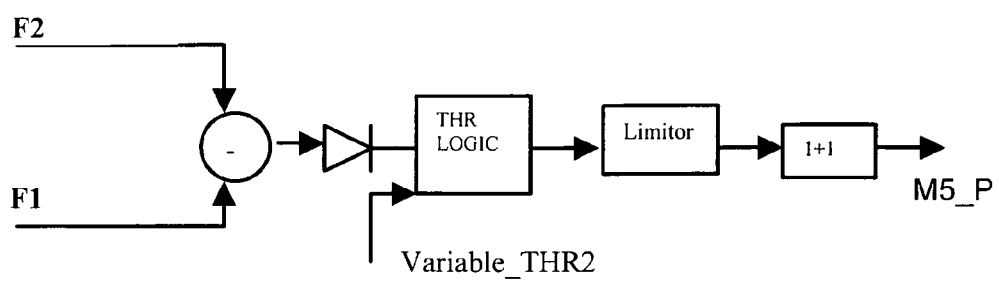
FIG. 23 is a schematic block diagram for detecting luma motion for PAL in the decoder, according to a first implementation of the invention.

FIG. 23 shows a schematic block diagram for detecting M5_P luma motion for PAL only. It should be noted that the logic depicted in FIG. 18 only gives proper motion for luma only regions. If the logic of FIG. 18 is used on colored regions, large false motions will result. The M5_P motion will be explained in further detail below.

Figure 24:
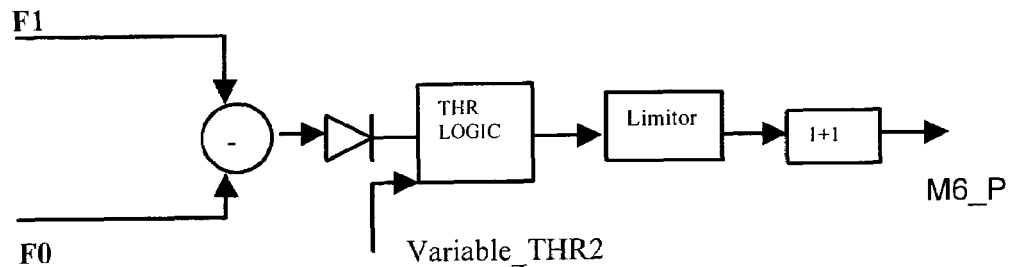
FIG. 24 is a schematic block diagram for detecting luma motion for PAL in the decoder, according to a second implementation of the invention.

FIG. 24 shows a schematic block diagram for detecting M6_P luma motion for PAL only. It should be noted that the logic depicted in FIG. 19 only gives proper motion for luma only regions. If the logic of FIG. 19 is used on colored regions, large false motions will result. The M6_P motion will be explained in further detail below.

Figure 25:
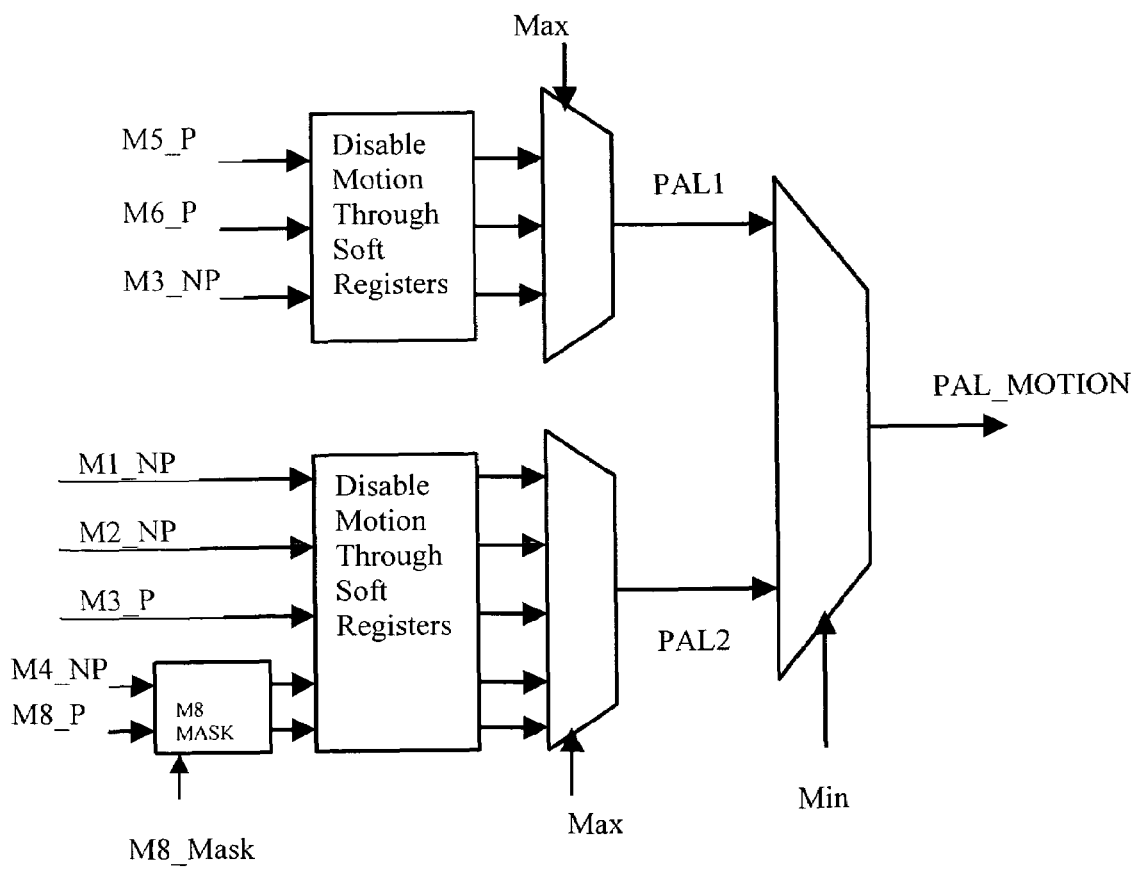
FIG. 25 is a schematic block diagram for the logic that is used to detect PAL motion in the decoder.

FIG. 25 shows a schematic block diagram for detecting PAL motion. The PAL1 signal, which is the maximum of signals M5_P, M6_P, and M3_NP obtained as shown in FIGS. 23, 24 and 5A, respectively, is used to detect the full range of luma motion. The PAL2 signal, which is the maximum of signals M1_NP, M2_NP, M3_P, M4_NP, and M8_P obtained as shown in FIGS. 4A, 21, 6A and 22, respectively, is used to detect chroma motion and low frequency luma motion. The PAL motion is determined to be the minimum of PAL1 and PAL2.

Figure 28:
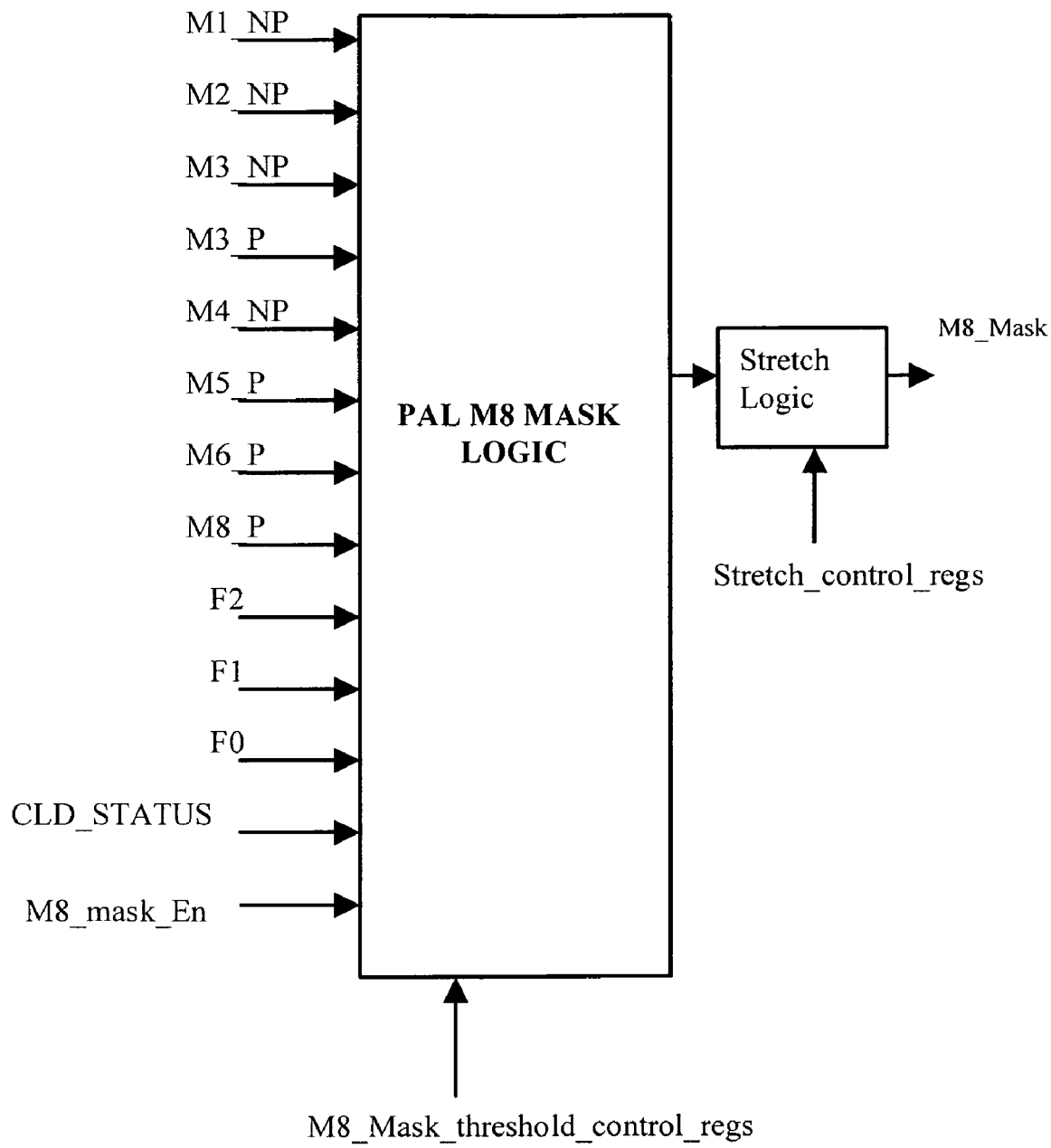
FIG. 28 is a schematic block diagram of mask logic used to remove false motions generated for high-frequency colored still regions for PAL signals.

As can be seen in FIG. 25, the M8_P and M4_P PAL motion paths have mask logic (M8 Mask) that eliminates false motion generated for high frequency colored still regions. The M8 Mask logic is required because the chroma signal does not cancel by two-frame addition for high frequency colored regions. The chroma signal contains luma near the sub-carrier frequency, which causes the video signal to be not exactly 180 degrees out of phase across two frames and results in false motion. Thus, the M8 Mask logic masks false motion for still high frequency colored regions, and also false motion due to chroma color transitions. A more detailed view of the M8 Mask logic can be seen in FIG. 28. As can be seen in FIG. 28, the M8 Mask logic receives the following inputs: M1_NP, M2_NP, M3_P, M4_NP, M5_P, M6_P, M8_P, F2, F1 and F0, CLD STATUS, M8 Mask En, and M8_Mask_threshold_control_regs. The M8 Mask logic examines signal characteristics, such as spatial chroma signature, temporal chroma signature, low frequency motion, chroma signal polarity across F2, F1, and F0, and the average value of a 4-sample window across F2, F1 and F0, and generates a mask signal (M8_Mask). In the implementation shown in FIG. 28, stretch/expansion logic is also provided for the M8_Mask signal before the mask signal is further processed by the PAL motion detection block.

In one implementation, there is also a small mask logic provided for the NTSC modes, when one frame chroma is used. When one frame chroma motion is used, false motions may be generated by the one frame chroma motion circuit due to the way the composite signal is formed. The mask logic detects and masks these false motions.

Figure 26:
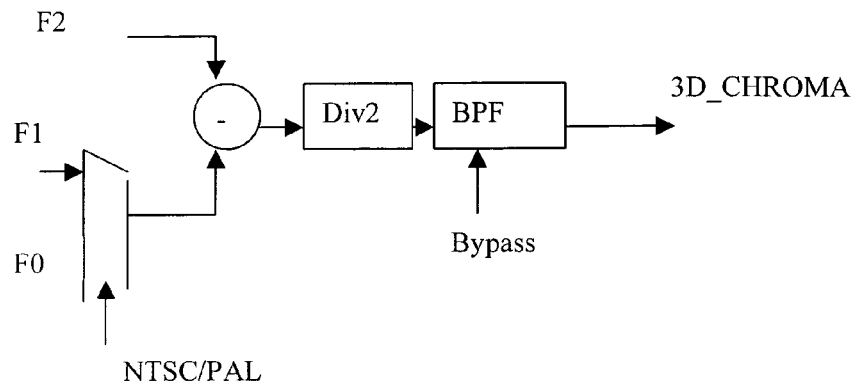
FIG. 26 is a schematic block diagram of the logic used to generate the 3D chroma signal in the decoder.

FIG. 26 shows a schematic block diagram of how the 3D chroma signal is generated. As can be seen in FIG. 21, for PAL the 3D chroma generation is done using frames F2 and F0, whereas for NTSC, the 3D chroma generation is done using frames F2 and F1. There is also a bypass option for the 3D chroma band pass filter. In one implementation, the default is to use the bypass option, so that we full bandwidth is used for the chroma signal. However, if for some reasons the large bandwidth creates artifacts, such as chroma overshoots, for example, the low frequency motion can be disabled by enable the band pass filter on this path.

Figure 27:
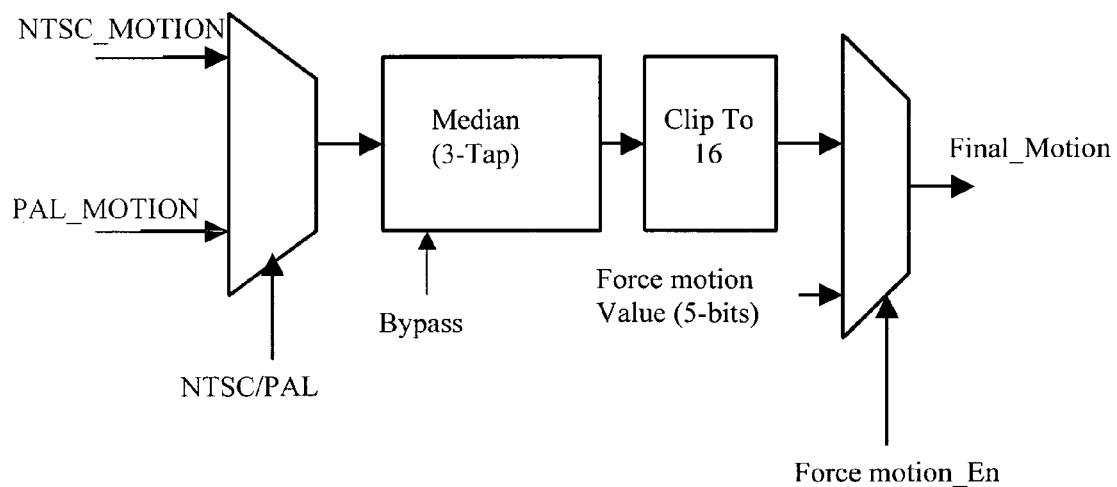
FIG. 27 is a schematic block diagram of the logic used to do the final motion determination for a combined NTSC/PAL system.

Finally, FIG. 27 shows a schematic block diagram of the final motion determination for a combined NTSC/PAL system. The NTSC motion is the maximum of the M1_NP, M2_NP, M3_NP and M4_NP signals, as described above with respect to FIG. 7. The PAL motion signal is generated as described above with respect to FIG. 25. Based on an NTSC/PAL mode detection signal either the NTSC_MOTION or the PAL_MOTION signals is selected. The selected motion signal is then filtered in a 3-tap median filter to remove spikes, and is finally clipped to 5 bits such that the motion signal has a maximum value of 16. The motion signal is then input to the blender (110) of FIG. 2, which combines the 2D and 3D decoding as described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described. Nevertheless, it will be understood that various modifications may be made without departing from the spirit and scope of the invention. For example, the invention has been described above with reference to NTSC and PAL video signals, which are typically used in broadcasting TV signals, but the invention is also equally applicable to component video, such as a video signal that is output from a DVD player. Accordingly, other embodiments are within the scope of the following claims.

The invention claimed is:

1. An apparatus, comprising:
a video decoder configured to receive a composite video signal modulated on a sub-carrier signal and having a luma component and a chroma component, the video decoder configured to perform a motion detection operation on the luma component and the chroma component in a plurality of frequency regions respectively;
variable threshold logic, coupled to the video decoder, and configured to provide a unique threshold value to the video decoder for each of the plurality of frequency regions respectively; and
a sub-carrier detection logic, coupled to the variable threshold logic, and configured to detect the sub-carrier signal by checking both spatial and temporal characteristics of the sub-carrier detection logic.

2. The apparatus of claim 1, wherein the sub-carrier detection logic is configured to receive a first frame, a second frame and a third frame, wherein the first frame is a current frame, the second frame is a previous frame with respect to the current frame, and the third frame is prior to the previous frame.

3. The apparatus of claim 1, wherein the sub-carrier detection logic is configured to check the temporal chroma component of the sub-carrier signal by analyzing the chroma amplitude across a first frame and a second frame of the sub-carrier signal and then across a single frame of the sub-carrier signal.

4. The apparatus of claim 1, wherein the sub-carrier detection logic is configured to check the temporal chroma component of the sub-carrier signal by analyzing the temporal polarity of the sub-carrier signal.

5. The apparatus of claim 2, wherein the sub-carrier detection logic further includes:
a first band pass filter, a second band pass filter, and a third band pass filter configured to receive the first frame, the second frame and the third frame respectively; and
a first delay element, a second delay element and a third delay element configured to receive outputs from the a first band pass filter, a second band pass filter, and a third band pass filter and configured to store four adjacent samples of the first frame, the second frame and the third frame respectively.

6. The apparatus of claim 1, wherein the sub-carrier detection logic further comprises:
a band pass filter configured to receive the composite vide signal;
four delay elements, coupled to the band pass filter, and configured to store four samples from the band pass filter respectively;

a first summation device configured to sum the stored samples in the first and the third delay elements;

a second summation device configured to sum the stored samples in the second and fourth delay elements;

a rectifier element configured to rectify and compare the output of the first and the second summation devices with a threshold voltage;

a first logic circuit configured to generate a first signal of a first logic state if the outputs of the two summation devices are less than the threshold voltage;

a second logic circuit configured to generate a second signal of the first logic state if alternate samples from the four delay elements are of the opposite logic state; and a third logic circuit configured to generate a chroma status signal if the first signal and the second signal are of the first logic state.

7. The apparatus of claim 1, wherein the sub-carrier detection logic is further configured to detect line chroma characteristics of the composite video signal, the sub-carrier detection logic further comprising:

a first band pass filter, a second band pass filter and a third band pass filter configured to receive a first line, a second line and a third line of the composite video signal;

a first delay element, a second delay element and a third delay element coupled to the first band pass filter, the second band pass filter and the third band pass filter respectively, the first delay element, the second delay element and the third delay element configured to store four line samples each; and a logic circuit configured to receive the stored line samples in the first delay element, the second delay element and the third delay element and to generate a line chroma signal.

8. The apparatus of claim 1, wherein the sub-carrier detection logic is further configured to generate and provide a control signal to the variable threshold logic to control the unique threshold value for motion detection.

9. The apparatus of claim 1, wherein the sub-carrier detection logic is further configured to check the temporal sub-carrier signal characteristics across frames of the composite video signal.

10. The apparatus of claim 1, wherein the sub-carrier detection logic is further configured to check the spatial sub-carrier characteristics across lines defined by the composite video signal.

* * * * *